(12) United States Patent
Howell et al.

(10) Patent No.: US 11,086,147 B2
(45) Date of Patent: *Aug. 10, 2021

(54) EYEWEAR SUPPORTING ELECTRICAL COMPONENTS AND APPARATUS THEREFOR

(71) Applicant: IngenioSpec, LLC, San Jose, CA (US)

(72) Inventors: Thomas A. Howell, San Jose, CA (US); David Chao, Saratoga, CA (US); C. Douglass Thomas, Saratoga, CA (US); Peter P. Tong, Mountain View, CA (US)

(73) Assignee: IngenioSpec, LLC, San Jose, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 16/127,957

(22) Filed: Sep. 11, 2018

(65) Prior Publication Data

US 2019/0033623 A1 Jan. 31, 2019

Related U.S. Application Data

(63) Continuation of application No. 14/715,501, filed on May 18, 2015, now Pat. No. 10,330,956, which is a
(Continued)

(51) Int. Cl.
*G02C 1/00* (2006.01)
*G02C 11/00* (2006.01)
(Continued)

(52) U.S. Cl.
CPC .............. *G02C 11/10* (2013.01); *G02C 5/143* (2013.01); *G02C 5/146* (2013.01); *G02C 11/06* (2013.01); *G02C 2200/08* (2013.01)

(58) Field of Classification Search
CPC ........ G02C 11/10; G02C 7/083; G02C 7/101; G02C 7/061; G02C 7/102
(Continued)

(56) References Cited

U.S. PATENT DOCUMENTS 320,558 A 6/1885 Hull
669,949 A 3/1901 Underwood
(Continued)

FOREIGN PATENT DOCUMENTS

CA 2 487 391 12/2003
CN 88203065 11/1988
(Continued)

OTHER PUBLICATIONS

Notice of Allowance for U.S. Appl. No. 11/183,269, dated Dec. 10, 2010.
(Continued)

*Primary Examiner* — Hung X Dang

(57) ABSTRACT

Techniques for providing eyewear with electrical components are disclosed. The electrical components can provide electrical technology to eyewear without having to substantially compromise aesthetic design principles of the eyewear. The electrical components can be partially or completely internal to eyewear. The electrical components can also be attached to the eyewear as an after-market enhancement. The electrical components can operate independently or together with other electrical components provided elsewhere. Apparatus for presenting after-market electrical components are also disclosed.

43 Claims, 20 Drawing Sheets

Related U.S. Application Data continuation of application No. 13/367,346, filed on Feb. 6, 2012, now Pat. No. 9,033,493, which is a continuation of application No. 12/462,286, filed on Jul. 31, 2009, now Pat. No. 8,109,629, which is a continuation of application No. 11/580,222, filed on Oct. 11, 2006, now Pat. No. 7,581,833.

(60) Provisional application No. 60/846,150, filed on Sep. 20, 2006, provisional application No. 60/787,850, filed on Apr. 1, 2006, provisional application No. 60/725,999, filed on Oct. 11, 2005, provisional application No. 60/725,896, filed on Oct. 11, 2005.

(51) Int. Cl.
*G02C 5/14* (2006.01)
*G02C 11/06* (2006.01)

(58) Field of Classification Search
USPC .................................. 351/158, 41, 111, 121
See application file for complete search history.

(56) References Cited

U.S. PATENT DOCUMENTS

| | | |
|---|---|---|
| 1,255,265 A | 2/1918 | Zachara |
| 1,917,745 A | 7/1933 | Weiss |
| 2,249,572 A | 7/1941 | Lieber |
| 2,638,532 A | 5/1953 | Brady |
| 2,794,085 A | 5/1957 | De Angelis |
| 2,818,511 A | 12/1957 | Ullery et al. |
| 2,830,132 A | 4/1958 | Borg |
| 2,874,230 A | 2/1959 | Carlson |
| 2,904,670 A | 9/1959 | Calmes |
| 3,060,308 A | 10/1962 | Fortuna |
| 3,597,054 A | 8/1971 | Winter |
| 3,710,115 A | 1/1973 | Jubb |
| 3,858,001 A | 12/1974 | Bonne |
| 3,883,701 A | 5/1975 | Delorenzo |
| 4,165,487 A | 8/1979 | Corderman |
| 4,254,451 A | 3/1981 | Cochran, Jr. |
| 4,283,127 A | 8/1981 | Rosenwinkel et al. |
| 4,322,585 A | 3/1982 | Liautaud |
| 4,348,664 A | 9/1982 | Boschetti et al. |
| 4,389,217 A | 6/1983 | Baughman et al. |
| 4,526,473 A | 7/1985 | Zahn, III |
| 4,535,244 A | 8/1985 | Burnham |
| 4,608,492 A | 8/1986 | Burnham |
| 4,683,587 A | 7/1987 | Silverman |
| 4,751,691 A | 6/1988 | Perera |
| 4,757,714 A | 7/1988 | Purdy et al. |
| 4,773,095 A | 9/1988 | Zwicker et al. |
| 4,806,011 A | 2/1989 | Bettinger |
| 4,822,160 A | 4/1989 | Tsai |
| 4,822,161 A | 4/1989 | Jimmy |
| 4,851,686 A | 7/1989 | Pearson |
| 4,856,086 A | 8/1989 | McCullough |
| 4,859,047 A | 8/1989 | Badewitz |
| 4,882,769 A | 11/1989 | Gallimore |
| 4,904,078 A | 2/1990 | Gorike |
| 4,942,629 A | 7/1990 | Stadlmann |
| 4,962,469 A | 10/1990 | Ono et al. |
| 4,967,268 A | 10/1990 | Lipton et al. |
| 4,985,632 A | 1/1991 | Bianco et al. |
| 5,008,548 A | 4/1991 | Gat |
| 5,015,086 A | 5/1991 | Okaue et al. |
| 5,020,150 A | 5/1991 | Shannon |
| 5,026,151 A | 6/1991 | Waltuck et al. |
| 5,036,311 A | 7/1991 | Moran et al. |
| 5,050,150 A | 9/1991 | Ikeda |
| 5,064,410 A | 11/1991 | Frenkel et al. |
| 5,093,576 A | 3/1992 | Edmond et al. |
| 5,106,179 A | 4/1992 | Kamaya et al. |
| 5,148,023 A | 9/1992 | Hayashi et al. |
| 5,151,600 A | 9/1992 | Black |
| 5,161,250 A | 11/1992 | Ianna et al. |
| 5,172,256 A | 12/1992 | Sethofer et al. |
| 5,264,877 A | 11/1993 | Hussey |
| 5,306,917 A | 4/1994 | Black et al. |
| 5,353,378 A | 10/1994 | Hoffman et al. |
| 5,359,370 A | 10/1994 | Mugnier |
| 5,359,444 A | 10/1994 | Piosenka et al. |
| 5,367,345 A | 11/1994 | da Silva |
| 5,379,464 A | 1/1995 | Schleger et al. |
| 5,382,986 A | 1/1995 | Black et al. |
| 5,394,005 A | 2/1995 | Brown et al. |
| 5,452,026 A | 9/1995 | Marcy, III |
| 5,452,480 A | 9/1995 | Ryden |
| 5,455,637 A | 10/1995 | Kallman et al. |
| 5,455,640 A | 10/1995 | Gertsikov |
| 5,457,751 A | 10/1995 | Such |
| 5,463,428 A | 10/1995 | Lipton et al. |
| 5,500,532 A | 3/1996 | Kozicki |
| D369,167 S | 4/1996 | Hanson et al. |
| 5,510,961 A | 4/1996 | Peng |
| 5,513,384 A | 4/1996 | Brennan et al. |
| 5,533,130 A | 7/1996 | Staton |
| 5,541,641 A | 7/1996 | Shimada |
| 5,581,090 A | 12/1996 | Goudjil |
| 5,585,871 A | 12/1996 | Linden |
| 5,589,398 A | 12/1996 | Krause et al. |
| 5,590,417 A | 12/1996 | Rydbeck |
| 5,606,743 A | 2/1997 | Vogt et al. |
| 5,608,808 A | 3/1997 | da Silva |
| 5,634,201 A | 5/1997 | Mooring |
| 5,671,035 A | 9/1997 | Barnes |
| 5,686,727 A | 11/1997 | Reenstra et al. |
| 5,694,475 A | 12/1997 | Boyden |
| 5,715,323 A | 2/1998 | Walker |
| 5,737,436 A | 4/1998 | Boyden et al. |
| 5,818,381 A | 10/1998 | Williams |
| 5,835,185 A | 11/1998 | Kallman et al. |
| 5,900,720 A | 5/1999 | Kallman et al. |
| 5,903,395 A | 5/1999 | Rallison et al. |
| 5,923,398 A | 7/1999 | Goldman |
| 5,941,837 A | 8/1999 | Amano et al. |
| 5,946,071 A | 8/1999 | Feldman |
| 5,949,516 A | 9/1999 | McCurdy |
| 5,966,746 A | 10/1999 | Reedy et al. |
| 5,980,037 A | 11/1999 | Conway |
| 5,988,812 A | 11/1999 | Wingate |
| 5,991,085 A | 11/1999 | Rallison et al. |
| 5,992,996 A | 11/1999 | Sawyer |
| 5,995,592 A | 11/1999 | Shirai et al. |
| 6,010,216 A | 1/2000 | Jesiek |
| 6,013,919 A | 1/2000 | Schneider et al. |
| 6,028,627 A | 2/2000 | Helmsderfer |
| 6,046,455 A | 4/2000 | Ribi et al. |
| 6,060,321 A | 5/2000 | Hovorka |
| 6,061,580 A | 5/2000 | Altschul et al. |
| 6,091,546 A | 7/2000 | Spitzer |
| 6,091,832 A | 7/2000 | Shurman et al. |
| 6,115,177 A | 9/2000 | Vossler |
| 6,132,681 A | 10/2000 | Faran et al. |
| 6,145,983 A | 11/2000 | Schiffer |
| 6,154,552 A | 11/2000 | Koroljow et al. |
| 6,176,576 B1 | 1/2001 | Green et al. |
| 6,225,897 B1 | 5/2001 | Doyle et al. |
| 6,231,181 B1 | 5/2001 | Swab |
| 6,236,969 B1 | 5/2001 | Ruppert et al. |
| 6,243,578 B1 | 6/2001 | Koike |
| 6,259,367 B1 | 7/2001 | Klein |
| 6,270,466 B1 | 8/2001 | Weinstein et al. |
| 6,292,213 B1 | 9/2001 | Jones |
| 6,292,685 B1 | 9/2001 | Pompei |
| 6,301,367 B1 | 10/2001 | Boyden et al. |
| 6,307,526 B1 | 10/2001 | Mann |
| 6,343,858 B1 | 2/2002 | Zelman |
| 6,349,001 B1 | 2/2002 | Spitzer |
| 6,349,422 B1 | 2/2002 | Schleger et al. |
| 6,409,335 B1 | 6/2002 | Lipawsky |
| 6,409,338 B1 | 6/2002 | Jewell |
| 6,426,719 B1 | 7/2002 | Nagareda et al. |
| 6,431,705 B1 | 8/2002 | Linden |

(56) References Cited

U.S. PATENT DOCUMENTS

| | | |
|---|---|---|
| 6,474,816 B2 | 11/2002 | Butler et al. |
| 6,478,736 B1 | 11/2002 | Mault |
| 6,506,142 B2 | 1/2003 | Itoh et al. |
| 6,511,175 B2 | 1/2003 | Hay et al. |
| 6,513,532 B2 | 2/2003 | Mault et al. |
| 6,517,203 B1 | 2/2003 | Blum et al. |
| 6,539,336 B1 | 3/2003 | Vock et al. |
| 6,542,081 B2 | 4/2003 | Torch |
| 6,546,101 B1 | 4/2003 | Murray et al. |
| 6,554,763 B1 | 4/2003 | Amano et al. |
| 6,582,075 B1 | 6/2003 | Swab et al. |
| 6,619,799 B1 | 9/2003 | Blum et al. |
| 6,629,076 B1 | 9/2003 | Haken |
| 6,729,726 B2 | 5/2004 | Miller et al. |
| 6,736,759 B1 | 5/2004 | Stubbs et al. |
| 6,764,194 B1 | 7/2004 | Cooper |
| 6,769,767 B2 | 8/2004 | Swab et al. |
| 6,788,309 B1 | 9/2004 | Swan et al. |
| 6,792,401 B1 | 9/2004 | Nigro et al. |
| 6,816,314 B2 | 11/2004 | Shimizu et al. |
| 6,824,265 B1 | 11/2004 | Harper |
| 6,857,741 B2 | 2/2005 | Blum et al. |
| 6,871,951 B2 | 3/2005 | Blum et al. |
| 6,879,930 B2 | 4/2005 | Sinclair et al. |
| 6,912,386 B1 | 6/2005 | Himberg et al. |
| 6,929,365 B2 | 8/2005 | Swab et al. |
| 6,932,090 B1 | 8/2005 | Reschke et al. |
| 6,947,219 B1 | 9/2005 | Ou |
| 7,004,582 B2 | 2/2006 | Jannard et al. |
| 7,013,009 B2 | 3/2006 | Warren |
| 7,023,594 B2 | 4/2006 | Blum et al. |
| 7,030,902 B2 | 4/2006 | Jacobs |
| 7,031,667 B2 | 4/2006 | Horiguchi |
| 7,033,025 B2 | 4/2006 | Winterbotham |
| 7,059,717 B2 | 6/2006 | Bloch |
| 7,073,905 B2 | 7/2006 | Da Pra' |
| 7,079,876 B2 | 7/2006 | Levy |
| 7,123,215 B2 | 10/2006 | Nakada |
| 7,192,136 B2 | 3/2007 | Howell et al. |
| 7,255,437 B2 | 8/2007 | Howell et al. |
| 7,265,358 B2 | 9/2007 | Fontaine |
| 7,274,292 B2 | 9/2007 | Velhal et al. |
| 7,289,767 B2 | 10/2007 | Lai |
| 7,312,699 B2 | 12/2007 | Chornenky |
| 7,331,666 B2 | 2/2008 | Swab et al. |
| 7,376,238 B1 | 5/2008 | Rivas et al. |
| 7,380,936 B2 | 6/2008 | Howell et al. |
| 7,401,918 B2 | 7/2008 | Howell et al. |
| 7,405,801 B2 | 7/2008 | Jacobs |
| 7,429,965 B2 | 9/2008 | Weiner |
| 7,438,409 B2 | 10/2008 | Jordan |
| 7,438,410 B1 | 10/2008 | Howell et al. |
| 7,445,332 B2 | 11/2008 | Jannard et al. |
| 7,481,531 B2 | 1/2009 | Howell et al. |
| 7,500,746 B1 | 3/2009 | Howell et al. |
| 7,500,747 B2 | 3/2009 | Howell et al. |
| 7,512,414 B2 | 3/2009 | Jannard et al. |
| 7,517,083 B2 | 4/2009 | Blum et al. |
| 7,527,374 B2 | 5/2009 | Chou |
| 7,543,934 B2 | 6/2009 | Howell et al. |
| 7,581,833 B2 | 9/2009 | Howell et al. |
| 7,621,634 B2 | 11/2009 | Howell et al. |
| 7,648,236 B1 | 1/2010 | Dobson |
| 7,677,723 B2 | 3/2010 | Howell et al. |
| 7,760,898 B2 | 7/2010 | Howell et al. |
| 7,771,046 B2 | 8/2010 | Howell et al. |
| 7,792,552 B2 | 9/2010 | Thomas et al. |
| 7,806,525 B2 | 10/2010 | Howell et al. |
| 7,922,321 B2 | 4/2011 | Howell et al. |
| 7,976,159 B2 | 7/2011 | Jacobs et al. |
| 8,109,629 B2 | 2/2012 | Howell et al. |
| 8,142,015 B2 | 3/2012 | Paolino |
| 8,174,569 B2 | 5/2012 | Tanijiri et al. |
| 8,337,013 B2 | 12/2012 | Howell et al. |
| 8,430,507 B2 | 4/2013 | Howell et al. |
| 8,434,863 B2 | 5/2013 | Howell et al. |
| 8,465,151 B2 | 6/2013 | Howell et al. |
| 8,485,661 B2 | 7/2013 | Yoo et al. |
| 8,500,271 B2 | 8/2013 | Howell et al. |
| 8,770,742 B2 | 7/2014 | Howell et al. |
| 8,905,542 B2 | 12/2014 | Howell et al. |
| 9,033,493 B2 | 5/2015 | Howell et al. |
| 9,244,292 B2 | 1/2016 | Swab et al. |
| 9,400,390 B2 | 7/2016 | Osterhout et al. |
| 9,405,135 B2 | 8/2016 | Sweis et al. |
| 9,488,520 B2 | 11/2016 | Howell et al. |
| 9,547,184 B2 | 1/2017 | Howell et al. |
| 9,690,121 B2 | 6/2017 | Howell et al. |
| 10,042,186 B2 | 8/2018 | Chao et al. |
| 10,060,790 B2 | 8/2018 | Howell et al. |
| 10,061,144 B2 | 8/2018 | Howell et al. |
| 10,310,296 B2 | 6/2019 | Howell et al. |
| 10,345,625 B2 | 7/2019 | Howell et al. |
| 10,359,311 B2 | 7/2019 | Howell et al. |
| 10,359,459 B1 | 7/2019 | Gorin |
| 10,624,790 B2 | 4/2020 | Chao et al. |
| 10,777,048 B2 | 9/2020 | Howell et al. |
| 2001/0005230 A1 | 6/2001 | Ishikawa |
| 2001/0028309 A1 | 10/2001 | Torch |
| 2001/0050754 A1 | 12/2001 | Hay et al. |
| 2002/0017997 A1 | 2/2002 | Felkowitz |
| 2002/0021407 A1 | 2/2002 | Elliott |
| 2002/0081982 A1 | 6/2002 | Schwartz et al. |
| 2002/0084990 A1 | 7/2002 | Peterson, III |
| 2002/0089639 A1 | 7/2002 | Starner et al. |
| 2002/0090103 A1 | 7/2002 | Calisto, Jr. |
| 2002/0098877 A1 | 7/2002 | Glezerman |
| 2002/0101568 A1 | 8/2002 | Eberl et al. |
| 2002/0109600 A1 | 8/2002 | Mault et al. |
| 2002/0140899 A1 | 10/2002 | Blum et al. |
| 2002/0159023 A1 | 10/2002 | Swab |
| 2002/0197961 A1 | 12/2002 | Warren |
| 2003/0018274 A1 | 1/2003 | Takahashi et al. |
| 2003/0022690 A1 | 1/2003 | Beyda et al. |
| 2003/0032449 A1 | 2/2003 | Giobbi |
| 2003/0062046 A1 | 4/2003 | Wiesmann et al. |
| 2003/0065257 A1 | 4/2003 | Mault et al. |
| 2003/0067585 A1 | 4/2003 | Miller et al. |
| 2003/0068057 A1 | 4/2003 | Miller et al. |
| 2003/0083591 A1 | 5/2003 | Edwards et al. |
| 2003/0214630 A1 | 11/2003 | Winterbotham |
| 2003/0226978 A1 | 12/2003 | Ribi et al. |
| 2003/0231293 A1* | 12/2003 | Blum ............... G02F 1/133371 356/5.01 |
| 2004/0000733 A1 | 1/2004 | Swab et al. |
| 2004/0029582 A1 | 2/2004 | Swab et al. |
| 2004/0059212 A1 | 3/2004 | Abreu |
| 2004/0063378 A1 | 4/2004 | Nelson |
| 2004/0096078 A1 | 5/2004 | Lin |
| 2004/0100384 A1 | 5/2004 | Chen et al. |
| 2004/0101178 A1 | 5/2004 | Fedorovskaya et al. |
| 2004/0128737 A1 | 7/2004 | Gesten |
| 2004/0150986 A1 | 8/2004 | Chang |
| 2004/0156012 A1 | 8/2004 | Jannard et al. |
| 2004/0157649 A1 | 8/2004 | Jannard et al. |
| 2004/0160571 A1 | 8/2004 | Jannard |
| 2004/0160572 A1 | 8/2004 | Jannard |
| 2004/0160573 A1 | 8/2004 | Jannard et al. |
| 2004/0197002 A1 | 10/2004 | Atsumi et al. |
| 2004/0227219 A1 | 11/2004 | Su |
| 2005/0067580 A1 | 3/2005 | Fontaine |
| 2005/0078274 A1 | 4/2005 | Howell et al. |
| 2005/0088365 A1 | 4/2005 | Yamazaki et al. |
| 2005/0201585 A1 | 9/2005 | Jannard et al. |
| 2005/0213026 A1 | 9/2005 | Da Pra' |
| 2005/0230596 A1 | 10/2005 | Howell et al. |
| 2005/0238194 A1 | 10/2005 | Chornenky |
| 2005/0239502 A1 | 10/2005 | Swab et al. |
| 2005/0248717 A1 | 11/2005 | Howell et al. |
| 2005/0248718 A1 | 11/2005 | Howell et al. |
| 2005/0248719 A1 | 11/2005 | Howell et al. |
| 2005/0264752 A1 | 12/2005 | Howell et al. |
| 2006/0001827 A1 | 1/2006 | Howell et al. |
| 2006/0003803 A1 | 1/2006 | Thomas et al. |

(56) References Cited

U.S. PATENT DOCUMENTS

| | | |
|---|---|---|
| 2006/0023158 A1 | 2/2006 | Howell et al. |
| 2006/0034478 A1 | 2/2006 | Davenport |
| 2006/0107822 A1 | 5/2006 | Bowen |
| 2006/0132382 A1 | 6/2006 | Jannard |
| 2007/0030442 A1 | 2/2007 | Howell et al. |
| 2007/0035830 A1 | 2/2007 | Matveev et al. |
| 2007/0046887 A1 | 3/2007 | Howell et al. |
| 2007/0055888 A1 | 3/2007 | Miller et al. |
| 2007/0098192 A1 | 5/2007 | Sipkema |
| 2007/0109491 A1 | 5/2007 | Howell et al. |
| 2007/0186330 A1 | 8/2007 | Howell et al. |
| 2007/0200927 A1 | 8/2007 | Krenik |
| 2007/0208531 A1 | 9/2007 | Darley et al. |
| 2007/0248238 A1 | 10/2007 | Abreu |
| 2007/0270663 A1 | 11/2007 | Ng et al. |
| 2007/0271065 A1 | 11/2007 | Gupta et al. |
| 2007/0271116 A1 | 11/2007 | Wysocki et al. |
| 2007/0271387 A1 | 11/2007 | Lydon et al. |
| 2007/0279584 A1 | 12/2007 | Howell et al. |
| 2008/0062338 A1 | 3/2008 | Herzog et al. |
| 2008/0068559 A1 | 3/2008 | Howell et al. |
| 2008/0100792 A1 * | 5/2008 | Blum .............. G02C 11/10 351/44 |
| 2008/0144854 A1 | 6/2008 | Abreu |
| 2008/0151175 A1 | 6/2008 | Gross |
| 2008/0151179 A1 | 6/2008 | Howell et al. |
| 2008/0158506 A1 | 7/2008 | Fuziak |
| 2008/0218684 A1 | 9/2008 | Howell et al. |
| 2008/0262392 A1 | 10/2008 | Ananny et al. |
| 2008/0278678 A1 | 11/2008 | Howell et al. |
| 2009/0059159 A1 | 3/2009 | Howell et al. |
| 2009/0059169 A1 | 3/2009 | Jannard |
| 2009/0073375 A1 | 3/2009 | Nakada |
| 2009/0141233 A1 | 6/2009 | Howell et al. |
| 2009/0147215 A1 | 6/2009 | Howell et al. |
| 2009/0156128 A1 | 6/2009 | Franson et al. |
| 2009/0251660 A1 | 10/2009 | Figler et al. |
| 2009/0251661 A1 | 10/2009 | Fuziak, Jr. |
| 2009/0296044 A1 | 12/2009 | Howell et al. |
| 2010/0061579 A1 | 3/2010 | Rickards et al. |
| 2010/0079356 A1 | 4/2010 | Hoellwarth |
| 2010/0110368 A1 | 5/2010 | Chaum |
| 2010/0245754 A1 | 9/2010 | Matsumoto et al. |
| 2010/0296045 A1 | 11/2010 | Agnoli et al. |
| 2010/0309426 A1 | 12/2010 | Howell et al. |
| 2011/0102734 A1 | 5/2011 | Howell et al. |
| 2011/0164122 A1 | 7/2011 | Hardacker |
| 2011/0187990 A1 | 8/2011 | Howell et al. |
| 2011/0241976 A1 | 10/2011 | Boger et al. |
| 2011/0273365 A1 | 11/2011 | West et al. |
| 2012/0033061 A1 | 2/2012 | Ko et al. |
| 2012/0050668 A1 | 3/2012 | Howell et al. |
| 2012/0133885 A1 | 5/2012 | Howell et al. |
| 2012/0176580 A1 | 7/2012 | Sonsino |
| 2013/0072828 A1 | 3/2013 | Sweis et al. |
| 2013/0077175 A1 | 3/2013 | Hotta et al. |
| 2013/0143519 A1 | 6/2013 | Doezema |
| 2013/0201440 A1 | 8/2013 | Howell et al. |
| 2013/0308089 A1 | 11/2013 | Howell et al. |
| 2014/0132913 A1 | 5/2014 | Sweis et al. |
| 2014/0176902 A1 | 6/2014 | Sweis et al. |
| 2014/0198293 A1 | 7/2014 | Sweis et al. |
| 2014/0268008 A1 | 9/2014 | Howell et al. |
| 2014/0268013 A1 | 9/2014 | Howell et al. |
| 2014/0268017 A1 | 9/2014 | Sweis et al. |
| 2014/0361185 A1 | 12/2014 | Howell et al. |
| 2015/0085245 A1 | 3/2015 | Howell et al. |
| 2015/0230988 A1 | 8/2015 | Chao et al. |
| 2015/0253590 A1 | 9/2015 | Howell et al. |
| 2016/0246075 A9 | 8/2016 | Howell et al. |
| 2016/0302992 A1 | 10/2016 | Sweis et al. |
| 2017/0068117 A9 | 3/2017 | Howell et al. |
| 2017/0074721 A1 | 3/2017 | Howell et al. |
| 2017/0090219 A1 | 3/2017 | Howell et al. |
| 2017/0131575 A1 | 5/2017 | Howell et al. |
| 2017/0146829 A1 | 5/2017 | Howell et al. |
| 2017/0303187 A1 | 10/2017 | Crouthamel et al. |
| 2018/0314079 A1 | 11/2018 | Chao et al. |
| 2018/0335650 A1 | 11/2018 | Howell et al. |
| 2018/0348050 A1 | 12/2018 | Howell et al. |
| 2019/0187492 A1 | 6/2019 | Howell et al. |
| 2019/0272800 A1 | 9/2019 | Tao et al. |
| 2019/0278110 A1 | 9/2019 | Howell et al. |
| 2019/0285913 A1 | 9/2019 | Howell et al. |
| 2019/0310132 A1 | 10/2019 | Howell et al. |
| 2019/0318589 A1 | 10/2019 | Howell et al. |
| 2019/0387351 A1 | 12/2019 | Lyren et al. |
| 2020/0012127 A1 | 1/2020 | Howell et al. |
| 2020/0218094 A1 | 7/2020 | Howell et al. |
| 2020/0364992 A1 | 11/2020 | Howell et al. |

FOREIGN PATENT DOCUMENTS

| | | |
|---|---|---|
| CN | 89214222.7 | 3/1990 |
| CN | 90208199.3 | 11/1990 |
| DE | 10123226 A1 | 11/2002 |
| EP | 1134491 A2 | 9/2001 |
| FR | 2530039 A1 | 1/1984 |
| GB | 1467982 | 3/1977 |
| JP | 58-113912 | 7/1983 |
| JP | 58-113914 | 7/1983 |
| JP | 02-181722 | 7/1990 |
| JP | 09-017204 | 1/1997 |
| JP | 10-161072 | 6/1998 |
| JP | 2000-039595 | 2/2000 |
| JP | 2002 341059 A | 11/2002 |
| JP | 2005-151292 | 6/2005 |
| TW | 484711 | 6/2001 |
| WO | WO 97/12205 A1 | 4/1997 |
| WO | WO 99/50706 A1 | 10/1999 |
| WO | WO 01/06298 A1 | 1/2001 |
| WO | WO 02/06881 A2 | 1/2002 |
| WO | WO 03/069394 A1 | 8/2003 |
| WO | WO 03/100368 A1 | 12/2003 |
| WO | WO 03/100503 A2 | 12/2003 |
| WO | WO 04/012477 A2 | 2/2004 |
| WO | WO 04/025554 A1 | 3/2004 |

OTHER PUBLICATIONS

Office Action for U.S. Appl. No. 11/183,269, dated May 25, 2010.
Final Office Action for U.S. Appl. No. 11/183,269, dated Feb. 17, 2010.
Office Action for U.S. Appl. No. 11/183,269, dated Jun. 23, 2009.
Office Action for U.S. Appl. No. 11/183,269, dated Dec. 4, 2008.
Final Office Action for U.S. Appl. No. 11/183,269, dated Jun. 5, 2008.
Office Action for U.S. Appl. No. 11/183,269, dated Oct. 18, 2007.
Restriction Requirement for U.S. Appl. No. 11/183,269, dated Jun. 25, 2007.
Office Action for U.S. Appl. No. 13/085,402, dated Apr. 19, 2012.
Notice of Allowance for U.S. Appl. No. 13/085,402, dated Aug. 2, 2012.
Notice of Allowance for U.S. Appl. No. 13/085,402, dated Nov. 13, 2012.
Notice of Allowance for U.S. Appl. No. 13/085,402, dated Feb. 20, 2013.
Notice of Allowance for U.S. Appl. No. 13/085,402, dated Jun. 14, 2013.
Office Action for U.S. Appl. No. 13/955,336, dated Dec. 5, 2013.
Notice of Allowance for U.S. Appl. No. 13/955,336, dated Apr. 28, 2014.
Notice of Allowance for U.S. Appl. No. 13/955,336, dated Aug. 18, 2014.
Notice of Allowance for U.S. Appl. No. 13/955,336, dated Oct. 7, 2014.
Notice of Allowance for U.S. Appl. No. 13/955,336, dated Nov. 3, 2014.
Office Action for U.S. Appl. No. 14/557,409, dated Jun. 11, 2015.
Notice of Allowance for U.S. Appl. No. 14/557,409, dated Jan. 14, 2016.

(56) References Cited

OTHER PUBLICATIONS

Notice of Allowance for U.S. Appl. No. 14/557,409, dated Apr. 28, 2016.
Notice of Allowance for U.S. Appl. No. 14/557,409, dated Aug. 8, 2016.
Notice of Allowance for U.S. Appl. No. 14/557,409, dated Nov. 4, 2016.
Corrected Notice of Allowance for U.S. Appl. No. 14/557,409, dated Dec. 12, 2016.
Office Action for U.S. Appl. No. 15/375,423, dated Mar. 27, 2017.
Notice of Allowance for U.S. Appl. No. 15/375,423, dated Jul. 5, 2017.
Notice of Allowance for U.S. Appl. No. 15/375,423, dated Oct. 31, 2017.
Notice of Allowance for U.S. Appl. No. 15/375,423, dated Mar. 23, 2018.
Notice of Allowance for U.S. Appl. No. 15/375,423, dated Jul. 13, 2018.
Restriction Requirement for U.S. Appl. No. 11/580,222, dated Jun. 18, 2008.
Office Action for U.S. Appl. No. 11/580,222, dated Sep. 12, 2008.
Office Action for U.S. Appl. No. 11/580,222, dated Jan. 28, 2009.
Notice of Allowance for U.S. Appl. No. 11/580,222, dated Apr. 20, 2009.
U.S. Appl. No. 12/462,286, filed Jul. 31, 2009.
Restriction Requirement for U.S. Appl. No. 12/462,286, dated Sep. 17, 2010.
Office Action for U.S. Appl. No. 12/462,286, dated Jan. 13, 2011.
Notice of Allowance for U.S. Appl. No. 12/462,286, dated Jun. 24, 2011.
Notice of Allowance for U.S. Appl. No. 12/462,286, dated Nov. 22, 2011.
Office Action for U.S. Appl. No. 13/367,346, dated May 15, 2013.
Notice of Allowance for U.S. Appl. No. 13/367,346, dated Oct. 10, 2013.
Office Action for U.S. Appl. No. 13/367,346, dated Jan. 28, 2014.
Notice of Allowance for U.S. Appl. No. 13/367,346, dated Aug. 15, 2014.
Notice of Allowance for U.S. Appl. No. 13/367,346, dated Mar. 19, 2015.
Office Action ffor U.S. Appl. No. 14/715,501, dated Sep. 23, 2015.
Office Action for U.S. Appl. No. 14/715,501, dated Mar. 25, 2016.
Office Action for U.S. Appl. No. 14/715,501, dated Oct. 17, 2016.
Office Action for U.S. Appl. No. 14/715,501, dated Jul. 20, 2017.
Office Action for U.S. Appl. No. 14/715,501, dated Jan. 8, 2018.
Notice of Allowance for U.S. Appl. No. 14/715,501, dated May 9, 2018.
Notice of Allowance for U.S. Appl. No. 14/715,501, dated Sep. 11, 2018.
U.S. Appl. No. 12/806,312, filed Aug. 10, 2010.
Office Action for U.S. Appl. No. 12/806,312, dated Apr. 20, 2012.
Office Action for U.S. Appl. No. 12/806,312, dated Sep. 25, 2012.
Notice of Allowance for U.S. Appl. No. 12/806,312, dated Dec. 14, 2012.
Notice of Allowance for U.S. Appl. No. 12/806,312, dated Mar. 29, 2013.
U.S. Appl. No. 13/831,512, filed Mar. 14, 2013.
Office Action for U.S. Appl. No. 13/831,512, dated Jun. 4, 2013.
Office Action for U.S. Appl. No. 13/831,512, dated Feb. 24, 2014.
Office Action for U.S. Appl. No. 13/831,512, dated Jul. 2, 2014.
Office Action for U.S. Appl. No. 13/831,512, dated Jan. 21, 2015.
Office Action for U.S. Appl. No. 13/831,512, dated May 29, 2015.
Office Action for U.S. Appl. No. 13/831,512, dated Feb. 24, 2016.
Notice of Allowance for U.S. Appl. No. 13/831,512, dated Aug. 1, 2016.
Notice of Allowance for U.S. Appl. No. 13/831,512, dated Oct. 25, 2016.
Notice of Allowance for U.S. Appl. No. 13/831,512, dated Jan. 30, 2017.
Notice of Allowance for U.S. Appl. No. 13/831,512, dated Feb. 21, 2017.
Office Action for U.S. Appl. No. 15/396,428, dated Feb. 16, 2018.
Office Action for U.S. Appl. No. 15/396,428, dated Jun. 21, 2018.
Office Action for U.S. Appl. No. 15/409,723, dated Apr. 23, 2018.
Notice of Allowance for U.S. Appl. No. 11/183,256, dated Jan. 13, 2009.
Office Action for U.S. Appl. No. 11/183,256, dated Sep. 12, 2008.
Notice of Allowance for U.S. Appl. No. 11/183,256, dated Jul. 8, 2008.
Office Action for U.S. Appl. No. 11/183,256, dated Jan. 25, 2008.
Restriction Requirement for U.S. Appl. No. 11/183,256, dated Oct. 17, 2007.
Restriction Requirement for U.S. Appl. No. 11/183,256, dated Jun. 28, 2007.
Notice of Allowance for U.S. Appl. No. 11/546,685, dated Feb. 17, 2010.
Notice of Allowance for U.S. Appl. No. 11/546,685, dated Sep. 18, 2009.
Office Action for U.S. Appl. No. 11/546,685, dated Mar. 5, 2009.
Restriction Requirement for U.S. Appl. No. 11/546,685, dated Jan. 27, 2009.
U.S. Appl. No. 12/803,732, filed Jul. 1, 2010.
Notice of Allowance for U.S. Appl. No. 12/803,732, dated Sep. 1, 2011.
Notice of Allowance for U.S. Appl. No. 12/803,732, dated Nov. 15, 2011.
Notice of Allowance for U.S. Appl. No. 12/803,732, dated Jan. 30, 2012.
Notice of Allowance for U.S. Appl. No. 12/803,732, dated Apr. 17, 2012.
Notice of Allowance for U.S. Appl. No. 12/803,732, dated Jul. 5, 2012.
Notice of Allowance for U.S. Appl. No. 12/803,732, dated Oct. 19, 2012.
Notice of Allowance for U.S. Appl. No. 12/803,732, dated Feb. 13, 2013.
Office Action for U.S. Appl. No. 13/291,020, dated Jun. 4, 2012.
Office Action for U.S. Appl. No. 13/291,020, dated Apr. 23, 2012.
Notice of Allowance for U.S. Appl. No. 13/291,020, dated Aug. 2, 2012.
Notice of Allowance for U.S. Appl. No. 13/291,020, dated Nov. 2, 2012.
Notice of Allowance for U.S. Appl. No. 13/291,020, dated Feb. 11, 2013.
U.S. Appl. No. 13/831,419, filed Mar. 14, 2013.
Office Action for U.S. Appl. No. 13/831,419, dated Apr. 27, 2015.
Office Action for U.S. Appl. No. 13/831,419, dated Aug. 12, 2015.
Notice of Allowance for U.S. Appl. No. 13/831,419, dated Jan. 28, 2016.
Office Action for U.S. Appl. No. 13/831,419, dated Apr. 28, 2016.
Office Action for U.S. Appl. No. 13/831,419, dated Nov. 17, 2016.
Office Action for U.S. Appl. No. 13/831,419, dated Feb. 1, 2017.
Notice of Allowance for U.S. Appl. No. 13/831,419, dated Jun. 6, 2017.
Office Action for U.S. Appl. No. 13/831,419, dated Oct. 20, 2017.
Office Action for U.S. Appl. No. 13/831,419, dated Jun. 8, 2018.
U.S. Appl. No. 13/831,445, filed Mar. 14, 2013.
Office Action for U.S. Appl. No. 13/831,445, dated Feb. 20, 2015.
Notice of Allowance for U.S. Appl. No. 13/831,445, dated Oct. 21, 2016.
Notice of Allowance for U.S. Appl. No. 13/831,445, dated Jan. 9, 2017.
Corrected Notice of Allowance for U.S. Appl. No. 13/831,445, dated Jan. 23, 2017.
Notice of Allowance for U.S. Appl. No. 13/831,445, dated Apr. 25, 2017.
Office Action for U.S. Appl. No. 13/831,445, dated Feb. 6, 2018.
Notice of Allowance for U.S. Appl. No. 13/831,445, dated Aug. 8, 2018.
"±1.5g Dual Axis Micromachined Accelerometer", Freescale Semiconductor, Inc., Motorola Semiconductor Technical Data, MMA6260Q, Jun. 2004, pp. 1-7.

(56) References Cited

OTHER PUBLICATIONS

"APA Announces Shipment of the SunUV™ Personal UV Monitor", Press Release, Nov. 7, 2003, pp. 1-3.
"Camera Specs Take Candid Snaps", BBC News, Sep. 18, 2003, pp. 1-3.
"Cardo Wireless Attaching Clips and Wearing Headset", Cardo Systems, Inc., http://www.cardowireless.com/clips.php, downloaded Nov. 27, 2004, pp. 1-3.
"Environmental Health Criteria 14: Ultraviolet Radiation", International Programme on Chemical Safety, World Health Organization Geneva, 1979 http://www.ichem.org., pp. 1-102.
"Exclusive Media Event Marks Debut of Oakley Thump: World's First Digital Audio Eyewear", Oakley Investor Relations, Press Release, Nov. 15, 2004, pp. 1-2.
"Eyetop", Product-Features, eyetop eyewear, eyetop belt worn, http://www.eyetop.net/products/eyetop/features.asp., downloaded Nov. 6, 2003, pp. 1-2.
"Heart Rate Monitors", http://www.healthgoods.com, downloaded Dec. 4, 2004.
"How is the UV Index Calculated", SunWise Program, U.S. Environmental Protection Agency, http://www.epa.gov/sunwise/uvcalc.html, downloaded Oct. 14, 2004, pp. 1-2.
"Industrial UV Measurements", APA Optics, Inc., http://www.apaoptics.com/uv/, downloaded Jul. 12, 2004, p. 1.
"Motorola and Oakley Introduce First Bluetooth Sunglasses—Cutting Edge RAZRWire Line Offers Consumers On-The-Go Connections", Motorola Mediacenter-Press Release, Feb. 14, 2005, pp. 1-2.
"Oakley Thump: Sunglasses Meet MP3 Player", with image, http://news.designtechnica.com/article4665.html, Jul. 13, 2004.
"Personal UV monitor," Optics.org, http://optics.org/articles/news/6/6/7/1 (downloaded Dec. 20, 2003), Jun. 9, 2000, pp. 1-2.
"SafeSun Personal Ultraviolet Light Meter", http://healthchecksystems.com/safesun.htm, downloaded Jul. 12, 2004, pp. 1-4.
"SafeSun Personal UV Meter", Introduction, Optix Tech Inc., http://www.safesun.com, downloaded Feb. 5, 2004, pp. 1-2.
"SafeSun Personal UV Meter", features, Optix Tech Inc., http://www.safesun.com/features.html, downloaded May 1, 2004, pp. 1-2.
"Sharper Image—The FM Pedometer", e-Corporate Gifts.com, http://www.e-corporategifts.com/sr353.html, downloaded Jan. 22, 2005, pp. 1-2.
"Sun UV™ Personal UV Monitor", APA Optics, Inc., http://www.apaoptics.com/sunuv/uvfacts.html, downloaded Dec. 20, 2003, pp. 1-3.
"Ultraviolet Light and Sunglasses", Oberon's Frequently Asked Questions, http://www.oberoncompany.com/OBEnglish/FAQUV.html, downloaded Feb. 5, 2004, pp. 1-2.
"Ultraviolet Light Sensor", Barrett & Associates Engineering, http://www.barrettengineering.com/project_uvs.htm, downloaded Feb. 5, 2004, pp. 1-3.
"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.
"What Are Gripples?", Gripping Eyewear, Inc., http://www.grippingeyewear.com/whatare.html, downloaded Nov. 2, 2005.
"With Racing Heart", Skaloud et al., GPS World, Oct. 1, 2001, http://www.gpsworld.com/gpsworld/content/printContentPopup.jsp?id=1805, pp. 1-5.
Abrisa Product Information: Cold Mirrors, Abrisa, Jun. 2001, p. 1.
Abrisa Product Information: Commercial Hot Mirror, Abrisa, Jun. 2001, p. 1.
Alps Spectacle, Air Conduction Glass, Bone Conduction Glass, http://www.alps-inter.com/spec.htm, downloaded Dec. 10, 2003, pp. 1-2.
Altimeter and Compass Watches, http://store.yahoo.com/snowshack/altimeter-watches.html, downloaded May 3, 2004, pp. 1-2.
Bone Conduction Headgear HG16 Series, "Voiceducer," http://www.temco-j.co.jp/html/English/HG16.html, downloaded Dec. 10, 2003, pp. 1-3.

Carnoy, David, "The Ultimate MP3 Player for Athletes? Could be.", CNET Reviews, May 14, 2004, pp. 1-4.
Clifford, Michelle A., "Accelerometers Jump into the Consumer Goods Market", Sensors Online, http://www.sensorsmag.com, Aug. 2004.
Comfees.com, Adjustable Sports Band Style No. 1243, http://shop.store.yahoo.com/comfees/adsportbansty.html, downloaded Apr. 18, 2003, pp. 1-2.
Cool Last Minute Gift Ideas!, UltimateFatBurner Reviews and Articles, http://www.ultimatefatburner.com/gift-ideas.html, downloaded May 10, 2005, pp. 1-3.
Dickie et al. "Eye Contact Sensing Glasses for Attention-Sensitive Wearable Video Blogging," Human Media Lab, Queen's University, Kingston, ON K7L 3N6, Canada, est. Apr. 2004, pp. 1-2.
Dixen, Brian, "ear-catching", Supertesten, Mobil, Apr. 2003 (estimated), pp. 37-41.
Global Solar UV Index, A Practical Guide, World Health Organization, 2002, pp. 1-28.
Grobart, Sam, "Digit-Sizing Your Computer Data", News Article, Sep. 2004, p. 1.
Life Monitor V1.1, Rhusoft Technologies Inc., http://www.rhusoft.com/lifemonitor/, Mar. 1, 2003, pp. 1-6.
Manes, Stephen, "Xtreme Cam", Forbes Magazine, Sep. 5, 2005, p. 96.
Mio, PhysiCal, http://www.gophysical.com/, downloaded Jan. 27, 2004, 5 pp.
Monitoring Athletes Performance—2002 Winter Olympic News from KSL, Jan. 23, 2002, http://2002.ksl.com/news-3885i, pp. 1-3.
Niwa, "UV Index Information", http://www.niwa.cri.nz/services/uvozone/uvi-info, downloaded Jul., 15, 2004, pp. 1-2.
NuVision 60GX Steroscopic Wireless Glasses, Product Information, NuVision by MacNaughton, c. 1997, MacNaughton, Inc., pp. 1-2.
Pärkkä, Juha, et al., "A Wireless Wellness Monitor for Personal Weight Management", VTT Information Technology, Tampere, Finland, Nov. 2000, p. 1.
Pedometer, Model HJ-112, Omron Instruction Manual, Omron Healthcare, Inc., 2003, pp. 1-27.
PNY Announces Executive Attaché USB 2.0 Flash Drive and Pen Series, Press Release, PNY Technologies, Las Vegas, Jan. 8, 2004, pp. 1-2.
PNY Technologies, "Executive Attaché" http://www.pny.com/products/flash/execattache.asp downloaded Nov. 16, 2005.
Polar WM41 and 42 weight management monitor, http://www.simplysports/polar/weight_management/wm41-42.htm, downloaded Jan. 28, 2004, pp. 1-3.
Questions Answers, Pedometer.com, http://www.pedometer.com, downloaded May 5, 2005.
RazrWire, copyright Motorola, Inc., Jul. 2005, 1 page.
SafeSun Personal UV Meter, Scientific Data, Optix Tech Inc., http://www.safesun.com/scientific.html, downloaded May 1, 2004, pp. 1-3.
SafeSun Sensor, User's Manual, Optix Tech Inc., Jun. 1998, 2 pages.
SafeSun, Personal UV Meter, "Technical Specifications", Optix Tech Inc., http://www.safesun.com/technical.html, downloaded Jul. 12, 2004, pp. 1-2.
SafeSun, Personal UV Meter, Experiments, Optix Tech Inc., http://www.safesun.com/experiments.html, downloaded Feb. 5, 2004, pp. 1-2.
Shades of Fun, Blinking Light Glasses, http://www.shadesoffun.com/Nov/Novpgs-14.html, downloaded Jul. 9, 2005, pp. 1-4.
SportLine Fitness Pedometer—Model 360, UltimateFatBurner Superstore, http://www.ultimatefatburner-store.com/ac_004.html, downloaded May 10, 2005, pp. 1-2.
Steele, Bonnie G. et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.
Stevens, Kathy, "Should I Use a Pedometer When I Walk?", Healtheon/WebMD, Apr. 14, 2000.

(56) References Cited

OTHER PUBLICATIONS

Sundgot, Jørgen "2nd-gen Motorola Bluetooth headset", InfoSync World, Mar. 1, 2003, http://www.infosync.no/news/2002/n/2841.html, pp. 1-2.
SunSensors, Segan Industries, Inc., http://www.segan-ind.com/sunsensor.htm, downloaded Feb. 5, 2004, pp. 1-3.
SunUV™, Personal UV Monitor User's Guide, APA Optics, Inc., 2003 pp. 1-52.
SunUV™, Personal UV Monitor, APA Optics, Inc., http://www.apaoptics.com/sunuv/models.html, downloaded Dec. 20, 2003.
Talking Pedometer, Sportline, Inc., Jun. 2001 (Possibly earlier), 1 page.
The unofficial ELSA 3D Revelator page, Dec. 30, 1999, pp. 1-15.
Top Silicon PIN Photodiode, PD93-21C, Technical Data Sheet, Everlight Electronics Co., Ltd., 2004, pp. 1-9.
UV Light Meter, UVA and UVB measurement, UV-340, Instruction Manual, Lutron, Jun. 2003 (estimated), pp. 1-5.
UV-Smart, UVA/B Monitor, Model EC-960-PW, Instruction Manual, Tanita Corporation of America, Inc., downloaded Nov. 16, 2001.
Vitaminder Personal Carb Counter, http://www.auravita.com/products/AURA/ORBU11420.asp. Downloaded Nov. 15, 2005, pp. 1-4.
Yamada et al. "Development of an eye-movement analyser possessing functions for wireless transmission and autocalibration," Med. Biol. Eng. Comput., No. 28, v.4, Jul. 28, 1990, http://link.springer.com/article/10.1007%2FBF02446149?LI=true, pp. 1-2.
Office Action for U.S. Appl. No. 16/049,120, dated Feb. 28, 2020.
Notice of Allowance for U.S. Appl. No. 16/049,120, dated Jun. 3, 2020.
Office Action for U.S. Appl. No. 16/183,969, dated Jun. 24, 2020.
Office Action for U.S. Appl. No. 15/409,723, dated Oct. 31, 2018.
Office Action for U.S. Appl. No. 16/424,018, dated Jun. 10, 2020.
Notice of Allowance for U.S. Appl. No. 16/049,120, dated Sep. 21, 2020.
Notice of Allowance for U.S. Appl. No. 16/049,120, dated Feb. 23, 2021.
Notice of Allowance for U.S. Appl. No. 16/182,969, dated Oct. 14, 2020.
Office Action for U.S. Appl. No. 16/429,181, dated Sep. 30, 2020.
Notice of Allowance for U.S. Appl. No. 16/429,181, dated Feb. 1, 2021.
Notice of Allowance for U.S. Appl. No. 16/424,018, dated Oct. 20, 2020.
Notice of Allowance for U.S. Appl. No. 16/424,018, dated Mar. 8, 2021.

\* cited by examiner

EYEWEAR SUPPORTING ELECTRICAL COMPONENTS AND APPARATUS THEREFOR

CROSS-REFERENCE TO RELATED APPLICATIONS

This application is a continuation of U.S. patent application Ser. No. 14/715,501, filed May 18, 2015, now U.S. Pat. No. 10,330,956, and entitled "EYEWEAR SUPPORTING ELECTRICAL COMPONENTS AND APPARATUS THEREFOR" which is incorporated herein by reference, which in turn is a continuation of U.S. patent application Ser. No. 13/367,346, filed Feb. 6, 2012, now U.S. Pat. No. 9,033,493, and entitled "EYEWEAR SUPPORTING ELECTRICAL COMPONENTS AND APPARATUS THEREFOR" which is incorporated herein by reference, which in turn is a continuation of U.S. patent application Ser. No. 12/462,286, filed Jul. 31, 2009, now U.S. Pat. No. 8,109,629, and entitled "EYEWEAR SUPPORTING ELECTRICAL COMPONENTS AND APPARATUS THEREFOR" which is incorporated herein by reference, which in turn is a continuation of U.S. patent application Ser. No. 11/580,222, filed Oct. 11, 2006, now U.S. Pat. No. 7,581,833, and entitled "EYEWEAR SUPPORTING AFTER-MARKET ELECTRICAL COMPONENTS" which is hereby incorporated herein by reference.

This application and U.S. patent application Ser. No. 11/580,222 references U.S. patent application Ser. No. 11/183,269, filed Jul. 15, 2005, now U.S. Pat. No. 7,922,321, and entitled "EYEGLASSES SUPPORTING AFTER MARKET ELECTRICAL COMPONENTS," which is hereby incorporated herein by reference, which in turn is a continuation-in-part of U.S. patent application Ser. No. 10/964,011, filed Oct. 12, 2004, now U.S. Pat. No. 7,192,136, and entitled "TETHERED ELECTRICAL COMPONENTS FOR EYEGLASSES" which is hereby incorporated herein by reference, which in turn claims priority to each of: (i) U.S. Provisional Patent Application No. 60/509,631, filed Oct. 9, 2003, and entitled "TETHERED ELECTRICAL COMPONENTS FOR EYEGLASSES," which is hereby incorporated herein by reference; (ii) U.S. Provisional Patent Application No. 60/527,565, filed Dec. 8, 2003, and entitled "ADAPTABLE COMMUNICATION TECHNIQUES FOR ELECTRONIC DEVICES," which is hereby incorporated herein by reference; (iii) U.S. Provisional Patent Application No. 60/562,798, filed Apr. 15, 2004, entitled "EYEWEAR WITH ULTRAVIOLET DETECTION SYSTEM," and which is hereby incorporated herein by reference; (iv) U.S. Provisional Patent Application No. 60/583,169, filed Jun. 26, 2004, entitled "ELECTRICAL COMPONENTS FOR USE WITH EYEWEAR, AND METHODS THEREFOR," and which is hereby incorporated herein by reference; (v) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; and (vi) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference.

This application and U.S. patent application Ser. No. 11/183,269 also references each of: (i) U.S. Provisional Patent Application No. 60/618,107, filed Oct. 12, 2004, and entitled "TETHERED ELECTRICAL COMPONENTS FOR EYEGLASSES," which is hereby incorporated herein by reference; (ii) U.S. Provisional Patent Application No. 60/620,238, filed Oct. 18, 2004, entitled "EYEGLASSES WITH HEARING ENHANCED AND OTHER AUDIO SIGNAL-GENERATING CAPABILITIES," and which is hereby incorporated herein by reference; (iii) U.S. Provisional Patent Application No. 60/647,836, filed Jan. 31, 2005, and entitled "EYEGLASSES WITH HEART RATE MONITOR," which is hereby incorporated herein by reference; and (iv) U.S. Provisional Patent Application No. 60/647,826, filed Jan. 31, 2005, and entitled "EYEWEAR WITH ELECTRICAL COMPONENTS," which is hereby incorporated herein by reference.

This application and U.S. patent application Ser. No. 11/580,222 also claims priority to each of: (i) U.S. Provisional Patent Application No. 60/725,999, filed Oct. 11, 2005, and entitled "EYEWEAR SUPPORTING AFTER-MARKET ELECTRICAL COMPONENTS," which is hereby incorporated herein by reference; (ii) U.S. Provisional Patent Application No. 60/725,896, filed Oct. 11, 2005, and entitled "EYEGLASSES WITH ELECTRICAL COMPONENTS," which is hereby incorporated herein by reference; (iii) U.S. Provisional Patent Application No. 60/787,850, filed Apr. 1, 2006, and entitled "EYEGLASSES WITH A HEART RATE MONITOR," which is hereby incorporated herein by reference; and (iv) U.S. Provisional Patent Application No. 60/846,150, filed Sep. 20, 2006, and entitled "EYEGLASSES WITH ACTIVITY MONITORING," which is hereby incorporated herein by reference.

In addition, this application is related to each of: (i) U.S. patent application Ser. No. 10/822,218, filed Apr. 12, 2004, now U.S. Pat. No. 7,792,552, and entitled "EYEGLASSES FOR WIRELESS COMMUNICATIONS," which is hereby incorporated herein by reference; (ii) U.S. patent application Ser. No. 10/964,011, filed Oct. 12, 2004, now U.S. Pat. No. 7,192,136, and entitled "TETHERED ELECTRICAL COMPONENTS FOR EYEGLASSES," which is hereby incorporated herein by reference; (iii) U.S. patent application Ser. No. 11/006,343, filed Dec. 7, 2004, now U.S. Pat. No. 7,116,976, and entitled "ADAPTABLE COMMUNICATION TECHNIQUES FOR ELECTRONIC DEVICES," which is hereby incorporated herein by reference; (iv) U.S. patent application Ser. No. 11/078,855, filed Mar. 11, 2005, now U.S. Pat. No. 7,500,746, and entitled "EYEWEAR WITH RADIATION DETECTION SYSTEM," which is hereby incorporated herein by reference; (v) U.S. patent application Ser. No. 11/078,857, filed Mar. 11, 2005, and entitled "RADIATION MONITORING SYSTEM," which is hereby incorporated herein by reference; (vi) U.S. patent application Ser. No. 11/183,283, filed Jul. 15, 2005, and entitled "EVENT EYEGLASSES," which is hereby incorporated herein by reference; (vii) U.S. patent application Ser. No. 11/183,262, filed Jul. 15, 2005, now U.S. Pat. No. 7,760,898, and entitled "EYEGLASSES WITH HEARING ENHANCED AND OTHER AUDIO SIGNAL-GENERATING CAPABILITIES," which is hereby incorporated herein by reference; (viii) U.S. patent application Ser. No. 11/183,256, filed Jul. 15, 2005, now U.S. Pat. No. 7,500,747, and entitled "EYEGLASSES WITH ELECTRICAL COMPONENTS," which is hereby incorporated herein by reference; (ix) U.S. patent application Ser. No. 11/183,263, filed Jul. 15, 2005, now U.S. Pat. No. 7,380,936, and entitled "EYEGLASSES WITH A CLOCK OR OTHER ELECTRICAL COMPONENT," which is hereby incorporated herein by reference; (x) U.S. patent application Ser. No. 11/183,276, filed Jul. 15, 2005, now U.S. Pat. No. 7,255,437, and entitled "EYEGLASSES WITH ACTIVITY MONITORING," which is hereby incorporated herein by reference; and (xi) U.S. patent application Ser. No. 11/546,685, filed Oct. 11, 2006, now U.S. Pat. No. 7,806,525, and entitled "EYEGLASSES HAVING A CAMERA", which is hereby incorporated herein by reference.

BACKGROUND OF THE INVENTION

Traditionally, eyeglasses have not contained or made any use of electrical components. In recent years, attempts to include electrical components within eyeglasses have had limited success. Even incorporating a small electrical component, such as a microphone, into an eyeglass frame may not be a simple task because, for example, of the necessary electrical connections with the electrical component. Clearly, larger scale electrical components would be more difficult to be provided in or attached to eyeglass frames. Many eyeglasses frames tend to be very compact and lightweight and thus may not have a lot of space for electrical components. Moreover, since eyeglass frames are often fashionable items whose designs are important, there are substantial design tradeoffs involved with providing or attaching electrical components to eyeglass frames.

Even if electrical components are provided in an eyeglass frame, the ability to alter or change electrical components is problematic. Conventionally, once an eyeglass frame is manufactured, electrical components embedded in the eyeglass frame may not be removed, nor can addition electrical components be added into the eyeglass frame. Attachment of electrical components to eyeglass frames has not proven to be reliable, design friendly or commercially successful.

Hence, there is a need for improved approaches to facilitate modifications or alterations to electrical components used with eyeglasses.

SUMMARY OF THE INVENTION

Generally speaking, the invention pertains to techniques for providing eyewear with electrical components. The electrical components can provide electrical technology to eyewear (e.g., eyeglasses) without having to substantially compromise aesthetic design principles of the eyewear. Often, the electrical components can be attached to the eyewear as an after-market enhancement. The electrical components can operate independently or together with other electrical components provided elsewhere. Apparatus can also be provided to present after-market electrical components.

One aspect of the invention relates to temple arrangements for use with eyeglasses. According to this aspect, a temple arrangement includes one or more electrical components. The one or more electrical components are attached to or at least partially embedded in the temple arrangement.

Another aspect of the invention relates to a temple adapter for use with eyeglasses. According to this aspect, a temple adapter includes one or more electrical components that are able to be mechanically (and optionally electrically) coupled to a temple (including a temple tip) of the eyeglasses.

Still another aspect of the invention relates to one or more swappable temple portions for a pair of glasses. In one embodiment, a temple has a forward portion and a rearward portion which can removably couple to one another. In one implementation, different rearward portions can be used with the same forward portion. In other words, the different rearward portions can be swapped with one another. In one implementation, the different rearward portions can offer different electrical components/functionalities to the pair of glasses. For example, the different rearward portions can provide different electrical components/functionalities such as: battery/power, wireless communication, radio, headset, GPS, pedometer, sun sensor, hearing enhancement, image/video capturing, etc. In another embodiment, different forward portions can be used with the same rearward portion.

Yet still another aspect of the invention relates to eyewear having an extended endpiece so as to facilitate placement of one or more electrical components at the extended endpiece. The one or more electrical components can operate independently or together with other electrical components provided elsewhere. For example, other electrical components can be provided in other regions of the frame for the eyewear. In one particular example, the other electrical components can be located in a bridge area of the frame for the eyewear. In such an example, given that the endpiece is extended, the one or more electrical components can be placed at the endpiece and thereby communicate with other electrical components in a front area or the other endpiece without having to communicate through a hinge or connector.

The electrical components can support signal capturing, signal processing, signal transmission, signal display, signal storage and/or power provision. The signals can be, for example, analog or digital signals. The electrical components can, for example, be used to provide audio output and/or audio pick-up. The electrical components may include and/or control one or more sensors to monitor and/or signal the conditions of a user of the eyewear. The electrical components may also include and/or control one or more operation indicators to signal operational status of at least some other electrical components. In addition, the electrical components can be or pertain to a circuit board or module, which includes a plurality of electrical components.

The invention can be implemented in numerous ways, including a method, system, device, apparatus, and a computer readable medium. Several embodiments of the invention are discussed below.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
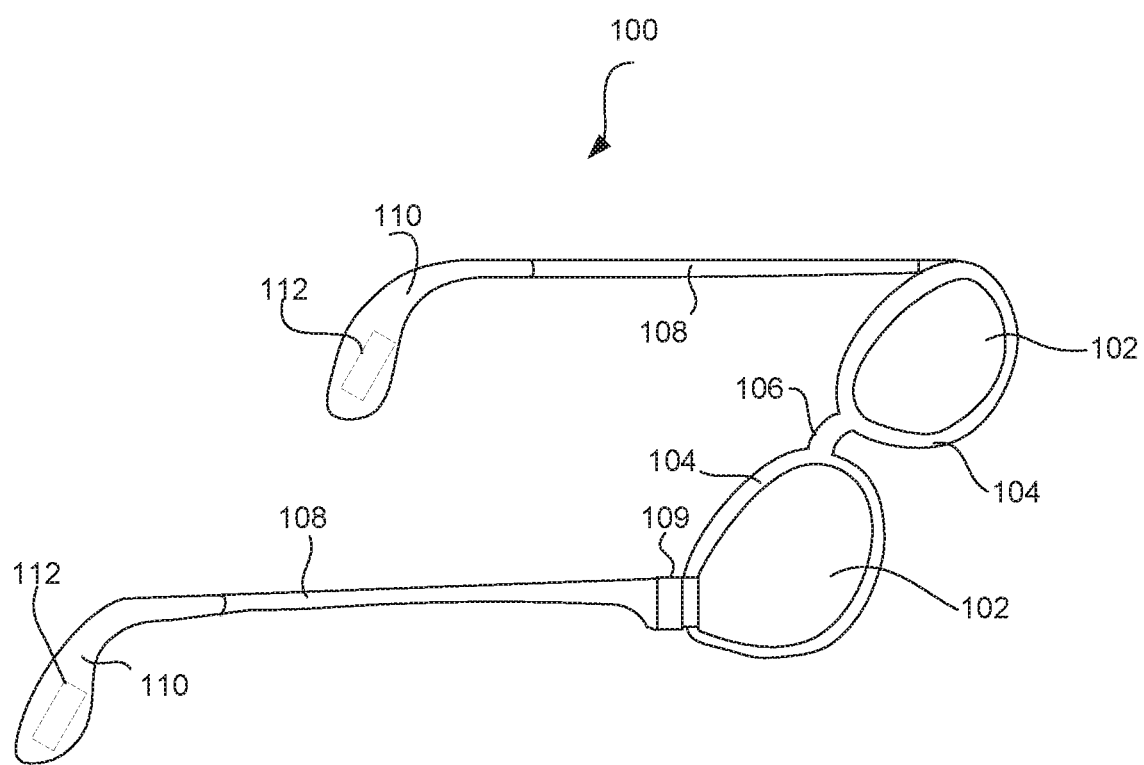
FIG. 1 is a perspective view of a pair of glasses according to one embodiment of the invention.

The invention pertains to techniques for providing eyewear with electrical components. The electrical components can provide electrical technology to eyewear (e.g., eyeglasses) without having to substantially compromise aesthetic design principles of the eyewear. Often, the electrical components can be attached to the eyewear as an aftermarket enhancement. The electrical components can operate independently or together with other electrical components provided elsewhere. Apparatus can also be provided to present after-market electrical components.

One aspect of the invention relates to temple arrangements for use with eyeglasses. According to this aspect, a temple arrangement includes one or more electrical components. The one or more electrical components are attached to or at least partially embedded in the temple arrangement.

Another aspect of the invention relates to a temple adapter for use with eyeglasses. According to this aspect, a temple adapter includes one or more electrical components that are able to be mechanically (and optionally electrically) coupled to a temple (including a temple tip) of the eyeglasses.

Still another aspect of the invention relates to one or more swappable temple portions for a pair of glasses. In one aspect, a temple has a forward portion and a rearward portion which can removably couple to one another. In one embodiment, different rearward portions can be used with the same forward portion. In other words, the different rearward portions can be swapped with one another. In one implementation, the different rearward portions can offer different electrical components/functionalities to the pair of glasses. For example, the different rearward portions can provide different electrical components/functionalities such as: battery/power, wireless communication, radio, headset, GPS, pedometer, sun sensor, hearing enhancement, image/video capturing, etc. In another embodiment, different forward portions can be used with the same rearward portion.

The electrical components can support signal capturing, signal processing, signal transmission, signal display, signal storage and/or power provision. The signals can be, for example, analog or digital signals. The electrical components can, for example, be used to provide audio output and/or audio pick-up. The electrical components may include and/or control one or more sensors to monitor and/or signal the conditions of a user of the eyewear. The electrical components may also include and/or control one or more operation indicators to signal operational status of at least some other electrical components. In addition, the electrical components can be or pertain to a circuit board or module, which includes a plurality of electrical components.

Embodiments of different aspects of the invention are discussed below with reference to FIGS. 1-13C. However, those skilled in the art will readily appreciate that the detailed description given herein with respect to these figures is for explanatory purposes as the invention extends beyond these limited embodiments.

FIG. 1 is a perspective view of a pair of glasses 100 according to one embodiment of the invention. The glasses 100 include a frame and a pair of lenses 102. The frame has lens holders 104 that hold the lenses 102 in position. The frame also has a bridge 106. The glasses 100 further include a pair of temples (or arms) 108. The temples 108 are considered part of the frame. As shown in FIG. 1, each of the temples 108 is coupled to one of the lens holders 104 by a hinge 109. In one embodiment, the temples 108 can be removed from the frame (e.g., at the hinge 109).

In addition, temple arrangements 110 are attached to the temples 108. Here, one or both of the temples 108 can include a temple arrangement 110. A temple arrangement 110 can include one or more electrical components 112. In one embodiment, the temple arrangements 110 can be considered separate parts that can be attached to respective temples 108. Once attached, the temple arrangements 110 can be considered part of, or an extension to, the temples 108.

By having one or more electrical components 112 in one or more of the temple arrangements 110, electrical capabilities can be provided to the glasses 100 without burdensome impact to the design of other parts of the frames. Moreover, by providing electrical components in one or more of the temple arrangements 112, electrical capabilities can be added to eyeglasses in an after-market manner. Still further, by replacing temple arrangements, a user could alter the electrical capabilities of his eyeglasses.

In one embodiment, the glasses 100 do not have any other embedded electrical components, such as within the frame, except those in one or both of the temple arrangements 112. In another embodiment, the glasses 100 include one or more other electrical components embedded or attached to the frame of the glasses 100 and the components are electrically coupled to the one or more electrical components 112 in one or both of the temple arrangements 110.

In different embodiments, the glasses 100 can be, for example, a pair of sunglasses, fit-over glasses, prescription glasses, reading glasses, or safety glasses.

Figure 2:
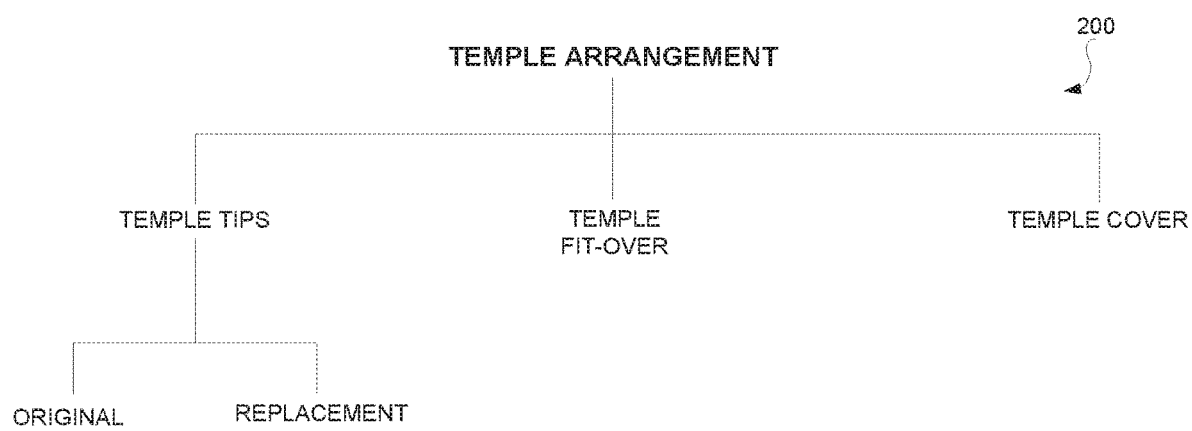
FIG. 2 illustrates a diagram of a number of different embodiments of temple arrangements according to the invention.

FIG. 2 illustrates a diagram of a number of different embodiments of temple arrangements 200 according to the invention. A temple arrangement 200 can be a temple tip, a temple fit-over, or a temple cover. In one embodiment, a temple tip is a structure that attaches to a rearward portion of a temple. In one embodiment, a temple tip can pertain to an enclosure that grabs onto a rearward portion of a temple. A temple tip is particularly common for wire frame eyeglass where the temple tip attaches to the rearward end of the temple and provides a surface suitable for positioning proximate to the user's ear. For example, FIG. 1 illustrates the temple arrangement 112 implemented as a temple tip.

In one embodiment, a temple tip is removable from its corresponding temple so that it can be replaced. The temple tip can be originally provided with the purchase of a pair of eyeglasses. Alternatively, the temple tip can be a replacement part that can be purchased separately and subsequently mounted onto a rearward portion of a temple of a pair of eyeglasses after removing any original temple tip. In another embodiment, a temple tip is permanently held onto the corresponding temple, for example, by an adhesive (e.g., epoxy, glue, etc.).

In one embodiment, a temple fit-over fits over at least a portion of the rearward end of a temple. If the rearward end of the temple has a temple tip, at least a portion of the temple tip can be fitted over by the temple fit-over. In one embodiment, a temple cover slides over and at least partially covers a portion of the rearward end of a temple. If the rearward end of the temple has a temple tip, at least a portion of the temple tip can be covered by the temple cover.

A temple cover is typically made of a material that is more flexible than a temple fit-over. For example, a temple cover can be made of a fabric or other materials, such as a sock or sleeve; while a temple fit-over can be made of plastic.

A temple arrangement 200 can be made of the same or different materials than the temple or other parts of the frame of the pair of eyeglasses. To illustrate, a pair of glasses with a metal frame can have non-metallic temple tips. A temple arrangement 200 can be of a color that is the same as, or similar to, or different from, that of the temple.

A temple arrangement 200 can be held onto a temple by frictional force. For example, if the temple arrangement 200 is a temple fit-over, it can be held onto an existing temple or temple tip by frictional force. Here, the temple fit-over is often removable. In another embodiment, the temple arrangement 200 can be permanently held onto its corresponding temple or temple tip. For example, the temple arrangement can be permanently held onto the corresponding temple or temple tip, for example, by an adhesive (e.g., epoxy, glue, etc.).

Depending on applications, a temple arrangement can be of different shapes. The shape can depend on the type of glasses. For example, a temple arrangement for fit-over glasses can be bigger than a temple arrangement for prescription glasses. The shape of the temple arrangement can also depend on applications for the electronic component(s) that are fully or partially embedded in the temple arrangement. Of course, aesthetic reasons can also influence shape (e.g., design, size, style) of a temple arrangement.

In one embodiment, the temple arrangement is a structure that has at least one electrical component attached thereto or at least partially embedded therein. In another embodiment, all of the electrical components to be provided with the temple arrangement are at least partially embedded in the temple arrangement.

Figure 3A:
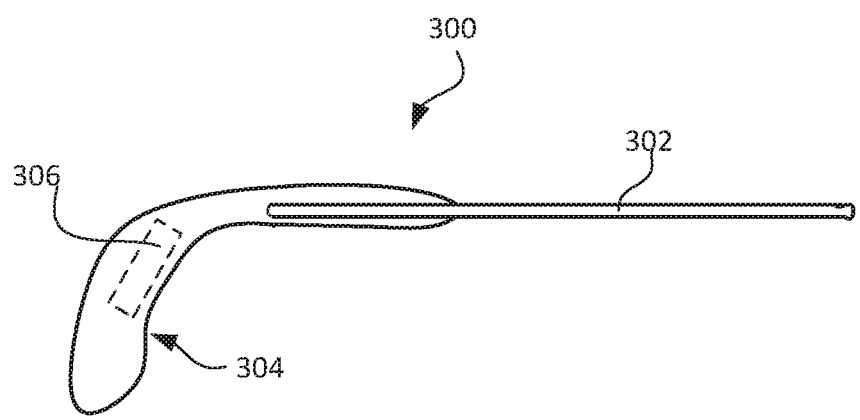
FIG. 3A is a diagram of a temple arrangement according to one embodiment of the invention.

FIG. 3A is a diagram of a portion 300 of a pair of eyeglasses according to one embodiment of the invention. The portion 300 includes a temple 302 that is associated with a pair of eyeglasses. Over the end of the temple 302 that is opposite the associated lens holder, a temple tip 304 is provided. The temple tip 304 can, for example, be held to the temple 302 by frictional forces and/or adhesive. The temple tip 304 includes at least one electrical component 306 that is at least partially embedded therein. A wide range of functionalities can be provided by the at least one electrical component 306. The temple tip 304 can be considered separate from or part of the temple 302. For example, when the temple tip 304 is not attached to the temple 302, the temple tip 304 is considered a separate part. As another example, when the temple tip 304 is attached to the temple 302, the temple tip 304 can be considered separate from or part of the temple 302.

The temple tip 304 can be manufactured and delivered to resellers or retailers and thereafter sold attached to eyeglasses. Alternatively, the temple tip 304 can be separately provided as an optional replacement temple tip for an original temple tip. Hence, after or during purchasing a pair of eyeglasses, upgrade of the eyeglasses can be had by replacing an existing temple tip with a replacement temple tip. The colors and shapes of the temple tip 304 can vary widely. In the after manufacturing environment, the reseller or retailer can be provided with a range of different colors and shapes so that a user can receive a replacement temple tip that reasonably matches the color and shape of the temple or that provides an altered appearance as desired by the user.

A number of embodiments have been described regarding one or more electrical components at least partially embedded in a pair of glasses. In one embodiment, one or more electrical components are at least partially embedded in a temple tip of a pair of glasses. Temple tips are relatively common for wire or metal frames which have wire or metal temples. The pair of glasses has a first and a second lens holders for receiving lenses. Each of the lens holders has a first side and a second side. The pair of glasses has a bridge element that couples the first side of the first lens holder to the second side of the second lens holder. The pair of glasses also includes a first temple and a second temple. The first temple is pivotally secured to the second side of the first lens holder through a joint, while the second temple is pivotally secured to the first side of the second lens holder through another joint. A temple typically has two ends, a first end and a second end. The first end can be the end that is pivotally secured to a lens holder through a joint, and the second end can be the other end of the temple. It is not uncommon that a temple includes a main body and an enclosure that grabs onto the main body of the temple. The second end is typically where the enclosure grabs onto the main body. The enclosure can be made of a different material than the main body of the temple. In one embodiment, such an enclosure is a temple tip, and there is an electrical component, partially or fully, embedded in the temple tip. There can also be a connector at the temple tip. In another embodiment, the temple tip can include a female connector. In still another embodiment, as a temple tip grabs onto the main body of the temple, a connector at the temple tip (such as a female connector) can make electrical contact with another connector (such as a male connector) at the main body of the temple. Typically, particularly before a pair of glasses has been extensively worn, the temple tip can be removed and re-inserted back on to the main body of the temple without much difficulty. Such a temple tip can be an after-market component, with different temple tips having different electrical components to serve different functions.

Besides a temple tip such as illustrated in FIG. 3A, a temple tip can also be effectively modified by a fit-over temple or temple cover.

Figure 3B:
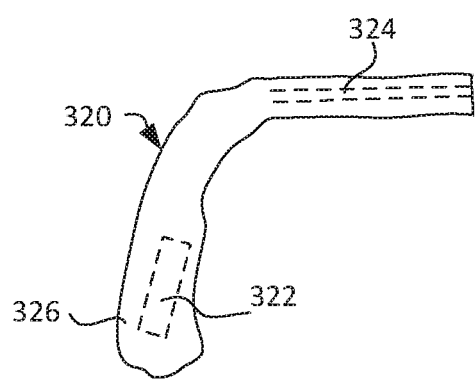
FIG. 3B is a diagram of a temple cover that at least partially covers a temple (e.g., temple and/or temple tip) according to one embodiment of the invention.

FIG. 3B is a diagram of a temple cover 320 that at least partially covers a temple (e.g., temple and/or temple tip) according to one embodiment of the invention. As an example, the temple cover 320 can be made of a fabric or other material, such as a sock or sleeve, that slides over and at least partially covers a temple or a temple tip. The temple cover 320 can include at least one electrical component 322 that is either attached thereto or at least partially embedded therein. The temple cover 320 can also include an opening 324 so as to receive a temple or a temple tip. In one embodiment, the temple cover 320 is placed over a substantial portion of a temple tip, and the opening 324 can extend to a far end 326 so as to receive all or a substantial part of the temple tip. The temple cover 320 can, for example, be held to a temple or a temple tip by frictional forces and/or adhesive.

Figure 3C:
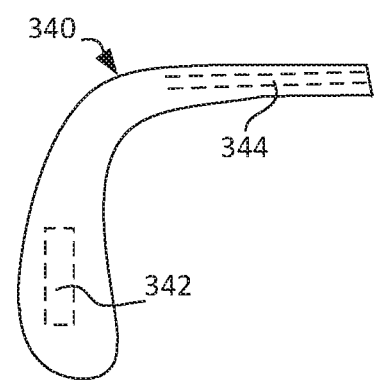
FIG. 3C is a diagram of a fit-over temple that at least partially fits over a temple (e.g., temple and/or temple tip) according to one embodiment of the invention.

FIG. 3C is a diagram of a fit-over temple 340 that at least partially fits over a temple (e.g., temple and/or temple tip) according to one embodiment of the invention. For example, the fit-over temple 340 can at least partially fit-over a temple tip. The fit-over temple 340 includes at least one electrical component 342 that is either attached thereto or at least partially embedded therein. The fit-over temple 340 can also include an opening 344 so as to receive a temple or a temple tip. The depth and/or width of the opening 344 within the fit-over temple 340 can vary depending on the extent to which it is being fit over a temple or a temple tip. The fit-over temple 340 can, for example, be held to a temple or temple tip by frictional forces and/or adhesive. As an example, the fit-over temple 340 can be plastic or other material. The colors and shapes of the fit-over temple 340 can have a lot of variations.

A wide range of functionalities can be provided by the at least one electrical component (e.g., electrical component 322 and 342). In the after manufacturing environment, the reseller or retailer can be provided with a range of different colors and shapes so that a user can receive a replacement temple cover or fit-over temple that reasonably matches the color and shape of the temple or that provides an altered appearance as desired by the user.

Figure 3D:
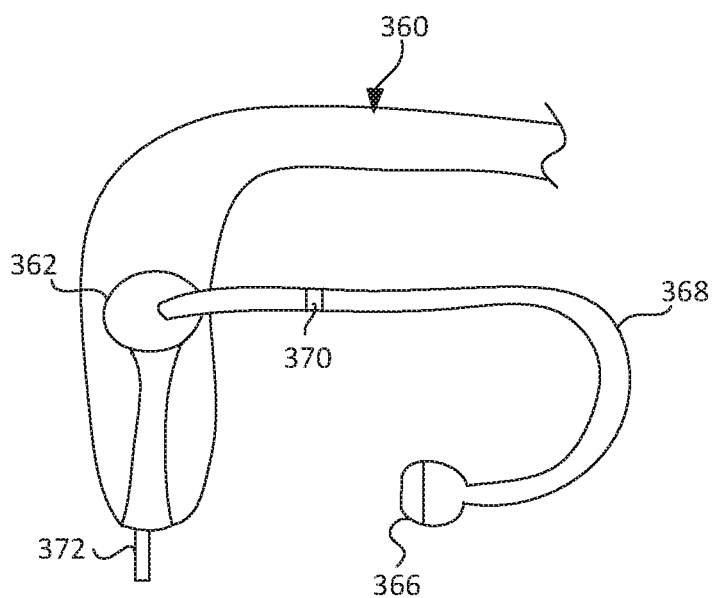
FIGS. 3D and 3E are diagrams of a temple arrangement according to another embodiment of the invention.
Figure 3E:
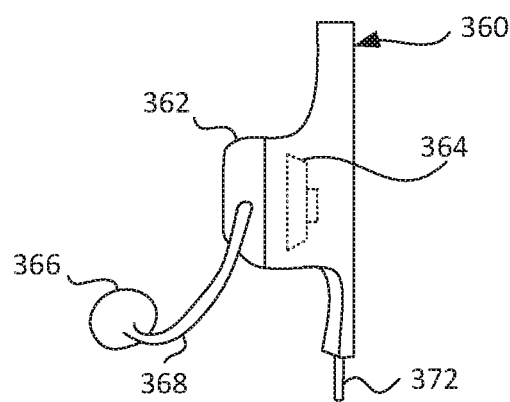

FIGS. 3D and 3E are diagrams of a temple arrangement 360 according to another embodiment of the invention. FIG. 3D is a side view of the temple arrangement 360, and FIG. 3E is a front view of the temple arrangement 360. In this embodiment, the temple arrangement 360 is a temple tip that can be attached to a temple (e.g., temple body) of a pair of eyeglasses. The temple arrangement 360 includes a speaker housing 362 allowing a speaker 364 to be at least partially embedded within the temple arrangement 360. An audio sound output by the speaker 364 is coupled to an ear plug 366 by way of the speaker housing 362 and a tube 368. Typically, the tube 368 is a flexible tube, such as a flexible plastic tube. A user of the eyeglasses having the temple arrangement 360 can place the ear plug 366 within her ear to facilitate coupling of the audio sound from the speaker 364 to the ear. The tube 368 can have a disconnection region 370 whereby at least a section of the tube 368 and the attached ear plug 366 can be removed from the temple arrangement 360, such as when audio output is not being listened to. The tube 368 and/or the speaker housing 362 can also be capable of rotating with respect to the temple arrangement 360 to facilitate ease of use. Still further, the temple arrangement 360 can include a connector 372, such as a male audio connector (e.g., 2.5 mm, stereo mini-phone connector). The connector 372 provides a means to electrically connect an external audio source to the speaker 364 within the temple arrangement 360. For example, at least one wire (not shown) that is internal to the temple arrangement 360 can be used to electrically connect the speaker 364 to the connector 372.

In one embodiment, an electrical component is a component of an electrical circuit or system, and the electrical circuit or system is for performing at least a desired, intended or predetermined function.

In one embodiment, a temple tip, fit-over temple or temple cover according to the invention can further include a connector or cable to facilitate electrical connection with the at least one electrical component that is either attached to a temple or a temple tip or at least partially embedded therein.

Still another aspect of the invention relates to one or more swappable temple portions for a pair of glasses. According to this aspect, a temple has a forward portion and a rearward portion which can removably couple to one another. In one embodiment, different rearward portions can be used with the same forward portion. In other words, the different rearward portions can be swapped with one another. In one implementation, the different rearward portions can offer different electrical components/functionalities to the pair of glasses. For example, the different rearward portions can provide different electrical components/functionalities such as: battery/power, wireless communication, radio, headset, GPS, pedometer, sun sensor, hearing enhancement, image/video capturing, etc. In another embodiment, different forward portions can be used with the same rearward portion.

In one embodiment, only one of the temples of an eyeglass frame has swappable part(s). In another embodiment, both of the temples of an eyeglass frame have swappable part(s). Regardless, viewed in one way, each of the swappable parts at a temple can be viewed as a removable peripheral device to the eyeglass frame.

In one embodiment, a temple is a multi-part temple. The multi-part temple includes at least a forward (or first) part and a rearward (or second) part. The forward part is typically integral with or coupled to an eyeglass frame (such as at the lens holder or hinge region of an eyeglass frame). The rearward part removably connects with the forward part. The removable connection allows the rearward part to be removed for any of a variety of reasons. For example, the rearward part can be removed to: (1) connect a different rearward part; (2) connect to a peripheral bus (e.g., for data download); or (3) charge a battery (e.g., located in forward or rearward part).

The removable connection between the forward and rearward parts of the multi-part temple physically attaches and secures the rearward part to the forward part by way of at least a mechanical connection. The mechanical connection can be provided in a variety of ways, such as through use of one or more connectors, snaps, detents, bayonets, etc.

In addition, the removable connection between the forward and the rearward parts of the multi-part temple can provide (or facilitate) an electrical connection between the forward and rearward parts. In one embodiment, the forward part of the temple (or some other part of the eyeglass frame) includes one or more electrical components, and the rearward part includes one or more electrical components. In such case, the electrical connection serves to electrically connect one or more of the electrical components of the forward part (or other part of the eyeglass frame) with one or more of the electrical components of the rearward part. For example, the forward part of the temple can include one or more electronic components (e.g., integrated circuit) that are electrically connected to one or more electronic components in the rearward part.

However, in the event that all needed electrical components are within the rearward part of the multi-part temple, electrical connection between the forward part and the rearward part may not be needed. Accordingly, in some embodiments, no electrical components will be needed in the forward part; instead, all the needed electrical components will be provided in the rearward part.

Various embodiments of eyewear can utilize the multi-part temples to provided electrical components to eyeglass frames in a convenient and user friendly manner. As one example, consider an eyeglass frame that supports a camera. The electrical components can include an image sensor, a memory, a microcontroller, and a battery. One or more of these electrical components can be in the forward part (or other part of the eyeglass frame) and the remaining one or more electrical components can be in the rearward part. For example, the image sensor and the microcontroller can be in the forward part and the battery and the memory can be in the rearward part. Additionally, if the camera makes use of a display (e.g., LCD), the display could be in either the forward part or the rearward part. The eyeglass frame might also include other electrical components for additional functionality. Examples of additional functionality include: global positioning system, antenna, user interface (e.g., buttons, switches, etc), display, microphone, earphone, etc. In another example, all of the electrical components supporting the camera functionality can be provided in the rearward part of the multi-part temple.

In one embodiment, the electrical components provided in the forward part are able to be shared with different rearward parts. In other words, different rearward parts can be swapped. For example, a different rearward part can be connected to the forward part to provide the eyeglass frame with different functionality. Examples of some of the different functionality that can be provided in this matter include: radio receiver (e.g., satellite radio), media player, pedometer, wireless communication, sun monitor, hearing enhancement, global positioning, etc. In a first example, in the case of a radio receiver, the forward part can include a display, while the rearward part can include a tuner, a rechargeable battery, an amplifier, and earphones or earphone connectors. In a second example, in the case of a media player, the forward part can include a display, while the rearward part can include a media player module, a memory, a rechargeable battery, a switch and earphones or earphone connectors. In a third example, in the case of a pedometer, the forward part can include a display, while the rearward part can include an accelerometer, a rechargeable battery, a memory and a microcontroller. In a fourth example, in the case of a wireless communication device, the forward part can include a display, while the rearward part can include a battery, an antenna, a wireless module, earphones or earphone connectors, and a user interface. The user interface, for example, can include buttons, which, for example, can facilitate user input with respect to on/off, volume, and accept or decline call. In this case, information displayed can include battery status, device status, caller ID, etc. In these four examples, the forward part includes a display and thus the forward part can be used (i.e., shared) with any of the different rearward parts to thereby provide different functionality to the eyeglass frames. Hence, by swapping one of these different rearward parts, the same pair of eyeglasses can provide different functionality.

A multi-part temple can be manufactured and delivered to resellers or retailers and thereafter sold attached to eyeglasses. Alternatively, a rearward part can be separately provided as a separate part or as an optional rearward part that can be swapped with an original rearward part. Hence, after or during purchasing a pair of eyeglasses, alteration, upgrade or conversion of the eyeglasses can be had by swapping in another rearward part. The electrical components or functions supported by the rearward part can vary widely. The colors and shapes of the rearward parts also can vary widely. For example, in the retailing or after manufacturing environment, the reseller or retailer can be provided with a range of different colors and shapes so that a user can receive a rearward part that reasonably matches the color and shape of the multi-part temple or that provides an altered appearance as desired by the user.

Figure 3F:
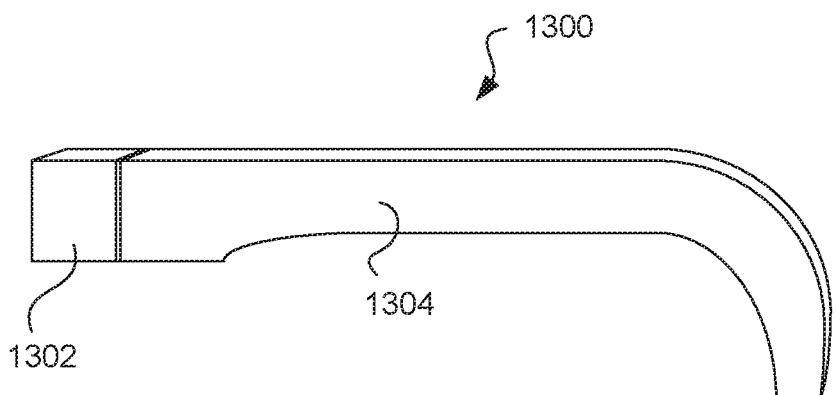
FIGS. 3F-3H are diagrams of exemplary multi-part temples according to different embodiments of the invention.

FIG. 3F is a diagram of a multi-part temple 1300 according to one embodiment of the invention. The multi-part temple 1300 has a forward part 1302 and a rearward part 1304. The rearward part 1304 is removably connected to the forward part 1302 such that the rearward part 1304 is removable. Once removed, the same rearward part or a different rearward part can be later connected to the forward part 1302. Alternatively, a cable can be connected to the forward part 1302 when the rearward part 1304 is removed. The cable can facilitate data transfer, battery charging, etc, depending on the electrical components in the forward part 1302.

Figure 3G:
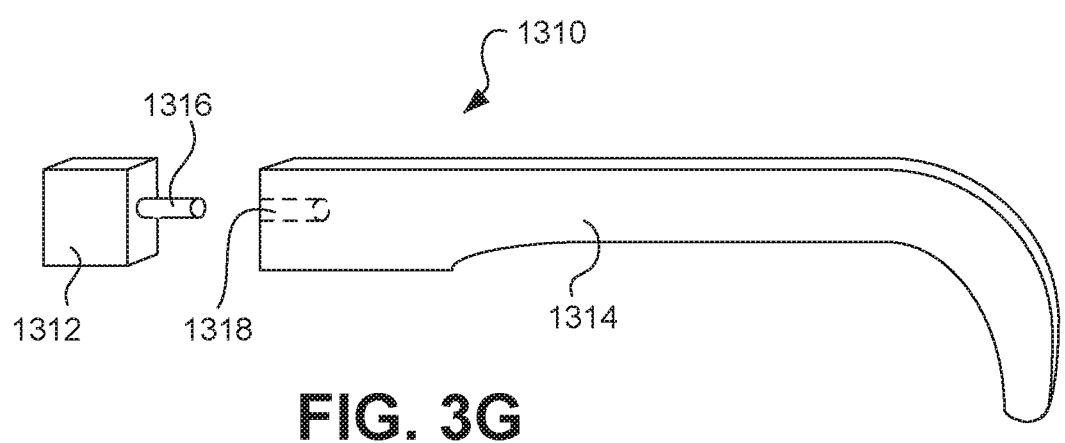

FIG. 3G is a diagram of a multi-part temple 1310 according to one embodiment of the invention. The multi-part temple 1310 can represent the multi-part temple 1300 shown in FIG. 1 in one embodiment. In FIG. 3G, a forward part 1312 and a rearward part 1314 are shown disconnected. The forward part 1312 has a mechanical element 1316 and the rearward part 1314 has a corresponding opening 1318. Once connected together, the mechanical element 1316 of the forward part 1312 is inserted into the opening 1318, thereby mechanically coupling the rearward part 1314 to the forward part 1312. Once mechanically coupled the rearward part 1314 is secured to the forward part 1312, but remains removable.

Figure 3H:
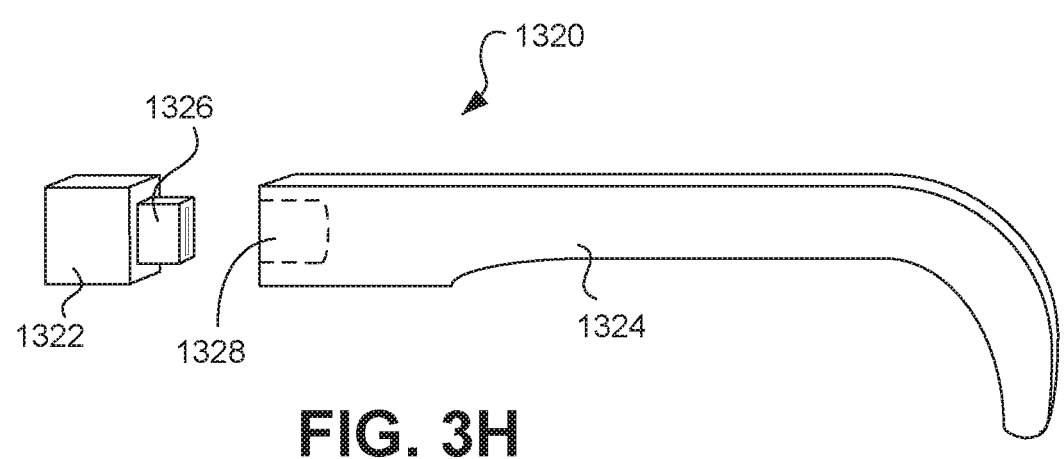

FIG. 3H is a diagram of a multi-part temple 1320 according to one embodiment of the invention. The multi-part temple 1320 can represent the multi-part temple 1300 shown in FIG. 1 in one embodiment. In FIG. 3H, a forward part 1322 and a rearward part 1324 are shown disconnected. The forward part 1322 has a connector 1326 and the rearward part 1324 has a corresponding connector 1328 embedded therein. Once connected together, the connector 1326 of the forward part 1322 is inserted into the corresponding connector 1328, thereby mechanically coupling the rearward part 1324 to the forward part 1322. Once mechanically coupled the rearward part 1324 is secured to the forward part 1322, but remains removable. Additionally, the connection of the connector 1326 and the corresponding connector 1328 can also provide an electrical connection. An electrical connection would serve to enable electrical components in the forward part 1322 (or other parts of an eyeglass frame) to electrically connect to electrical components in the rearward part 1324. For example, the electrical connection can provide electrical connections for one or more electrical wires. An example of one suitable type of connector is a USB connector which can provide mechanical and electrical connection.

Figure 3I:
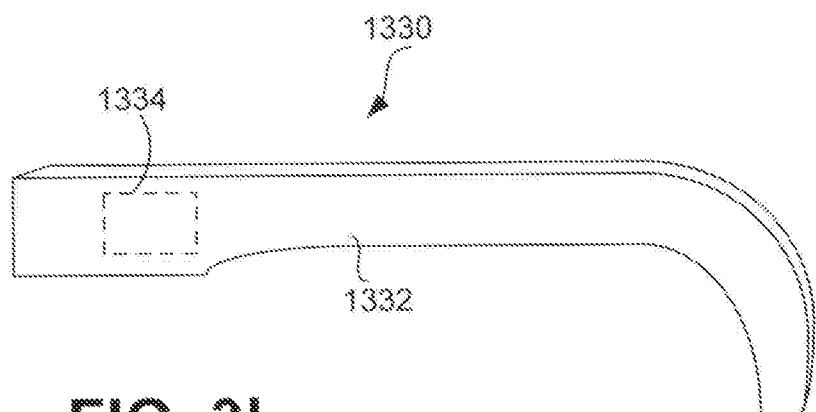
FIGS. 3I-3K are diagrams of exemplary rearward portions of multi-part temples according to several embodiments of the invention.

As noted above, a rearward part of a multi-part temple can include one or more electrical components. FIG. 3I is a diagram of a rearward part 1330 of a multi-part temple according to one embodiment of the invention. The rearward part 1330 has a body 1332 with electrical circuitry 1334 internal to the body 1332. As one example, the electrical circuitry 1334 can pertain to data storage (e.g., memory). In such an example, the rearward part 1330 can be considered a memory stick or a memory card. As other examples, the electrical circuitry 1334 can pertain to a battery/power source, a sun sensor, a pedometer, a media player, a wireless module, etc.

Figure 3J:
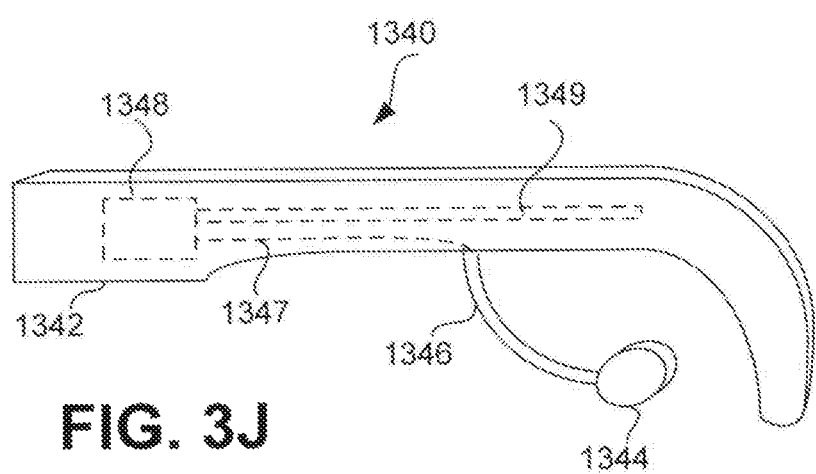

FIG. 3J is a diagram of a rearward part 1340 of a multi-part temple according to another embodiment of the invention. The rearward part 1340 has a body 1342 with an ear bud 1344 and an ear bud arm 1346 extending therefrom. In addition, the body 1342 includes at least one conductor 1347 and electrical circuitry 1348 internal to the body 1342. The at least one conductor 1347 can electrically connect the electrical circuitry 1348 with the ear bud 1344, where the at least one conductor 1347 extends through the ear bud arm 1346 to the ear bud 1344. Optionally, the body 1342 can further include an antenna 1349 internal to the body 1342. In the case where the electrical circuitry 1348 includes a wireless receiver (e.g., Bluetooth, XM, FM), the antenna 1349 can enhance reception. As an example, the electrical circuitry 1348, can be a wireless module for wireless communications or a receiver for XM or FM signals. Additionally or alternatively, the electrical circuitry 1348 can, for example, pertain to one or more of a data storage device, battery/power source, a sun sensor, a pedometer, a media player, etc.

Figure 3K:
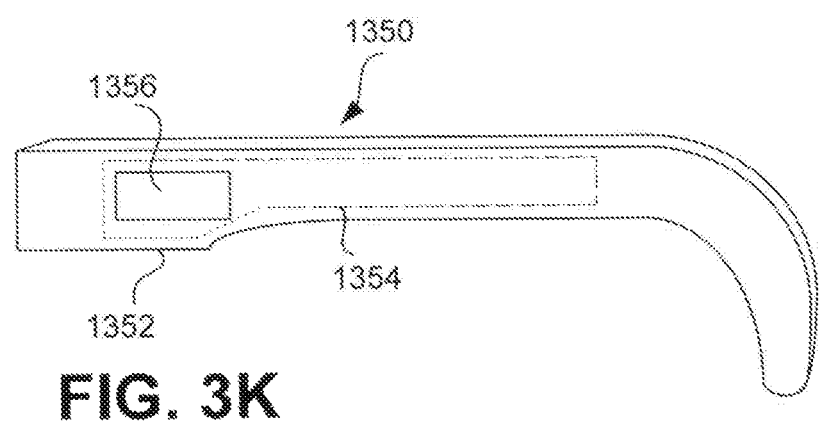

FIG. 3K is a diagram of a rearward part 1350 of a multi-part temple according to another embodiment of the invention. The rearward part 1330 has a body 1352 with a printed circuit board 1354 internal to the body 1352. A display device 1356 (e.g., LCD) can be provided on the body 1352. In one example, the display device 1356 can be mounted to the circuit board 1354 and exposed through an opening in the body 1352 so as to be visible by a user of the eyeglasses using the multi-part temple. Optionally, at least a portion of the printed circuit board 1354 can conform to the shape of the body 1352. The ability to conform, even partially, allows the printed circuit board 1354 to yield greater surface area within a temple, which tends to be small and stylized. The integrated circuit board 1354 can have one or more electronic components (e.g., integrated circuits) mounted thereon.

Figure 3L:
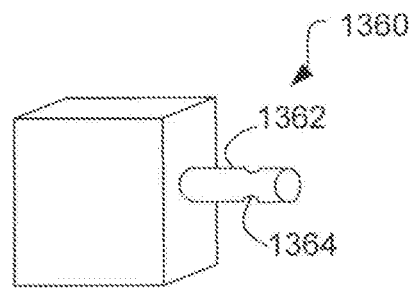
FIGS. 3L-3O are diagrams of exemplary forward portions of multi-part temples according to several embodiments of the invention.

FIGS. 3L-3O are diagrams of representative forward parts for multi-part temples according to different embodiments of the invention. FIG. 3L is a diagram of an exemplary forward part 1360 having a mechanical element 1362 that includes one or more detents 1364. When a rearward part is connected to the forward part 1360, the mechanical element 1362 is inserted into an opening (e.g., opening 1318) and held securely in place by mechanical forces facilitated by the mechanical element 1362 and the detents 1364. This can be accomplished through different methods, such as with corresponding protruding portions in the opening that can, for example, be aligned with the detents 1364. For example, the protruding portions can snap into place or biased by springs (e.g., spring-loaded).

Figure 3M:
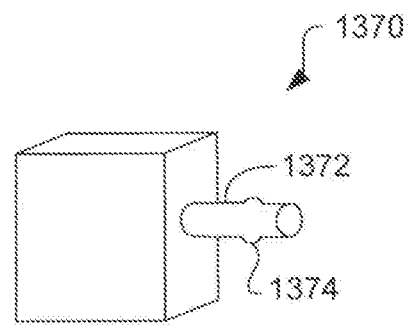

FIG. 3M is a diagram of an exemplary forward part 1370 having a mechanical element 1372 that includes one or more protrusions 1374. When a rearward part is connected to the forward part 1370, the mechanical element 1372 is inserted into an opening (e.g., opening 1318) and held securely in place by mechanical forces facilitated by the mechanical element 1372 and the protrusions 1374. In one embodiment, the protrusions 1374 are spring-loaded to facilitate connection with the opening.

Figure 3N:
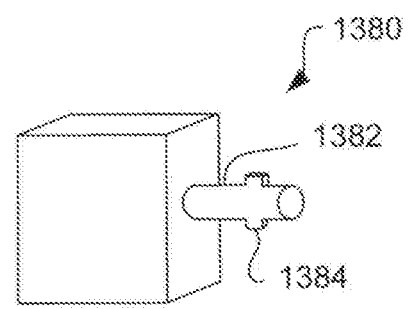

FIG. 3N is a diagram of an exemplary forward part 1380 having a mechanical element 1382 that includes one or more bayonet structures 1384. To connect a rearward part to the forward part 1380, the mechanical element 1382 is inserted into an opening (e.g., opening 1318) that has groves (in the direction substantially parallel to the axis of the mechanical element 1382) for receiving the bayonet structures 1384. The rearward part can be connected with the forward part 1380 when the groves within the opening of the rearward part are aligned with the bayonet structures 1384. Once the mechanical element 1382 is so inserted, the rearward part can be rotated with respect to the forward part 1380. The rotation causes the bayonet structures 1384 to no longer be aligned with the grooves. As a result, the rearward part is mechanically secured to the forward part 1380 (and thus the eyeglass frame) in a bayonet like manner.

In one embodiment, a connector is used to removably couple the rearward portion to the forward portion of a multi-part temple. For example, the connector can be standard connector. One example of a suitable connector is a Universal Serial Bus (USB) connector.

Figure 3O:
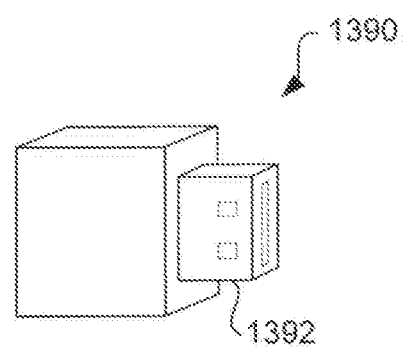

FIG. 3O is a diagram of an exemplary forward part 1390 having an electrical connector 1392. The connector 1392 facilitates mechanical and/or electrical connections between the forward part 1390 and a rearward part. When a rearward part is connected to the forward part 1390, the connector 1392 is inserted into an opening (e.g., opening 1328) and held securely in place by mechanical forces. There can be additional mechanical connecting mechanisms to further secure the connection.

In one embodiment, the opening receiving the connector 1392 can include a corresponding (i.e., counterpart) connector. When the connector 1392 is connected with the corresponding connector within the opening, the rearward part is physically secured to the forward part 1390. For example, mechanical forces can hold the connector 1392 and the corresponding connector in a connected position. In addition, when the connector 1392 and the corresponding counterpart connector are coupled together, one or more electrical connections are facilitated. For example, each connector can be coupled to one or more electrical wires at the other connector so that wires from one part are able to be connected to corresponding wires on the other part. As a result, electrical component(s) in the rearward part are able to be electrically connected with electrical component(s) in the forward part 1390 (or elsewhere in the eyeglass frame). In one implementation, the connectors pertain to or resemble a Universal Serial Bus (USB) type connector.

In another embodiment, the opening receiving the connector 1392 does include a corresponding counterpart connector. In this embodiment, mechanical forces can hold the connector 1392 within the opening. Also, in this embodiment, electrical connections are not facilitated.

Although FIGS. 3G-3N pertain to connections having a male connector at the forward part and a female connector at the rearward part, it should be understood that alternatively the male connector can be at the rearward part and the female connector can be at the forward part.

Also, although FIGS. 3G-3N pertain to connections showing only one elongated portion (like a male connector)

to be received by an opening (like a female connector), in other embodiments, there can be more than one elongated portion to be received by more than one opening. Also, the connections can be formed on the sides (i.e., outer surface), instead of by having elongated portions and openings positioned in the middle of (i.e., internal to) the forward and rearward parts. For example, there can be two prongs, one on the top surface and one on the bottom surface of a forward part. Each prong can be received by a counterpart detent in a rearward part, such as the prong on the top surface of the forward part to be received by a detent on the top surface of the rearward part.

In a number of embodiments, the forward part of the multi-part temple is substantially smaller than the rearward part. For example, in FIG. 3F, the forward part 1302 is substantially smaller than the rearward part 1304. In one embodiment, a forward part is large enough to house a connection mechanism used to couple with a rearward part and not too much larger. In another embodiment, a forward part and a rearward part are about the same size. In still another embodiment, a forward part is larger than a rearward part.

In one embodiment, neither the forward part nor the rearward part of a multi-part temple contains any electrical components. In such case, the rearward part can still be removable from the forward part. Such an embodiment enables a user to swap one (which can be substantially all of the temple) or both the rearward portions of both temples, with another rearward portion(s), such as for aesthetic, configuration or design reasons.

In one implementation, a connector is used to removably couple the rearward portion to the forward portion of the multi-part temple. For example, the connector can be a Universal Serial Bus (USB) connector.

In one embodiment, a forward part can be part of or integral with a corresponding region of a lens holder. In such case, there need not be any hinges for coupling the temples to the lens holders.

As noted above, connectors can be use to removably attach a temple to an eyeglass frame (e.g., lens holder) or to removably attach different portion(s) of a temple. These connectors can be provided for one or both temples of the eyeglass frames. With such temples being easily removable by users without the need for any special skill or tools, the temple parts can be interchangeable and can be separately sold or leased.

Further, to display various eyewear products, such as in a retail environment, an eyewear products display apparatus (e.g., stand) can include corresponding connectors or connector structures so that (i) separate temples (ii) separate parts of temples and/or (iii) eyeglass frames without temples can be connected to the eyewear products display apparatus for display. For example, if the eyewear products (e.g., frames, temples, etc.) use connectors, then the eyewear products display apparatus can support those same connectors (e.g., USB connectors) or compatible structures. This eyewear products display apparatus opens up new ways to organize and present eyewear products at retail stores. It also allows users to separately select a base eyewear frame and temples to be used therewith. The temples and the frames can be displayed detached from one another, such that a user can separately select and try different temples with frames.

Figure 3P:
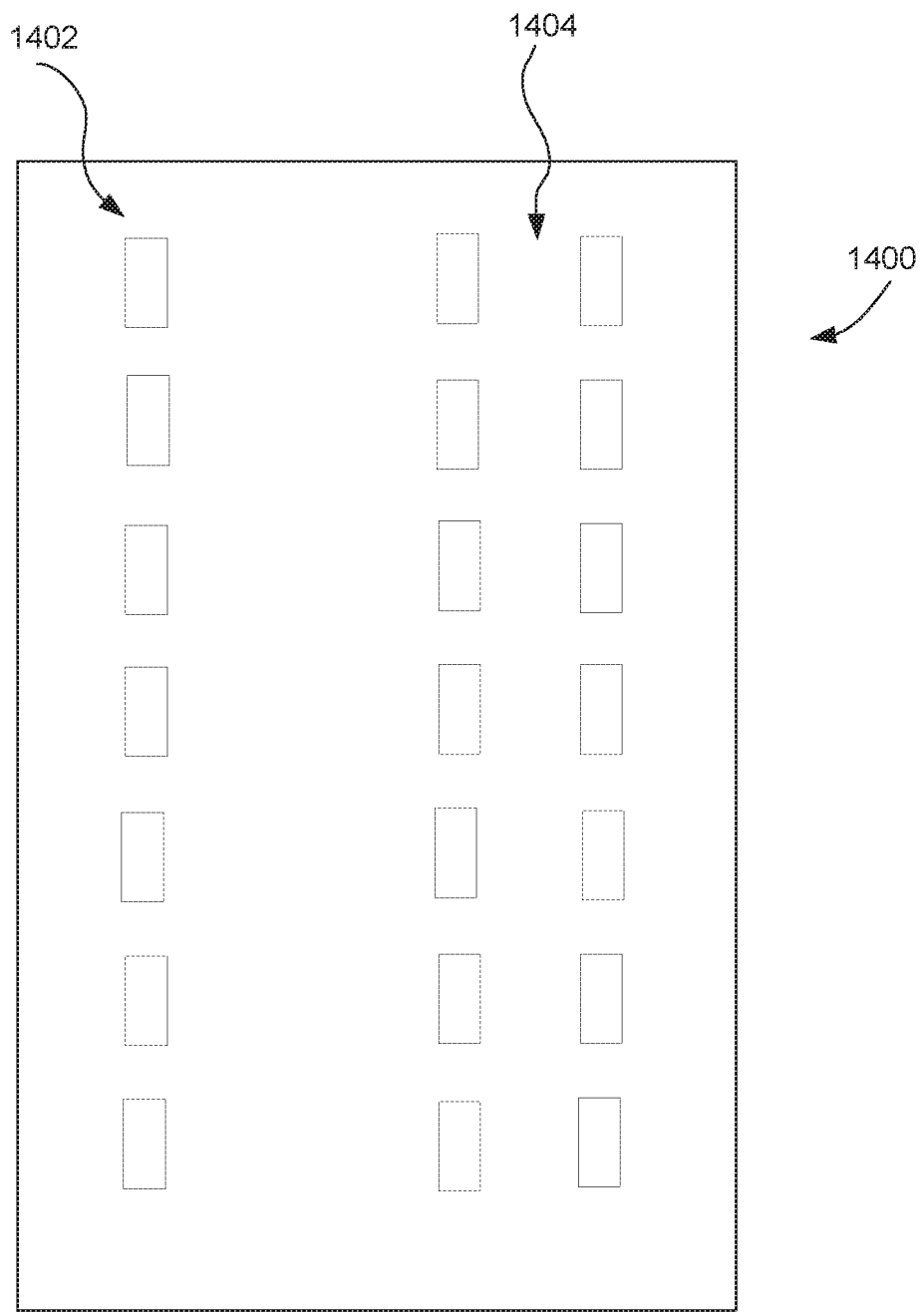
FIG. 3P is a diagram of an eyewear products display apparatus according to one embodiment of the invention.

FIG. 3P is a diagram of an eyewear products display apparatus 1400 according to one embodiment of the invention. The apparatus 1400 has a first region 1404 of first type connectors (or compatible protrusions) integral with the apparatus 1400. A plurality of eyeglass frames having second type connectors can be attached and displayed on the apparatus 1400 by connecting one or two of the second type connector of the eyeglass frames to those of the first type connectors of the first region of the apparatus 1400.

The apparatus 1400 also can include a second region 1402 of second type connectors (or compatible openings) integral with the apparatus 1400. A plurality of removable temples (and/or removable temple parts) having first type connectors can be attached and displayed on the apparatus 1400 by connecting the first type connectors of the removable temples (and/or removable temple parts) to those of the second type connectors (or compatible openings) in the second region 1402 of the apparatus 1400.

In one embodiment, the first type connectors are male connectors and the second type connectors are corresponding female connectors which provide a secure mechanical connection. In one embodiment, the first type connectors and/or the second type connectors provided integral with the apparatus 1400 are not electrical connectors but compatible structures (e.g., protrusions and openings) such that a secure mechanical connect can be had.

In one embodiment, the orientation of at least some of the connectors in the apparatus 1400 is substantially horizontal. In other words, for example, when a rearward part of a temple is inserted into such a connector in the apparatus 1400, the rearward part is substantially perpendicular to the surface of the apparatus 1400 as shown. In another embodiment, the orientation of at least some of the connectors in the apparatus 1400 is substantially facing upward or downward in a vertical manner. In other words, for example, when a rearward part of a temple is inserted into such a connector in the apparatus 1400, the rearward part is substantially parallel to the surface of the apparatus 1400 as shown. In yet another embodiment, the orientation is at an acute angle relative to the surface of the apparatus 1400 as shown. In other words, for example, when a rearward part of a temple is inserted into a connector in the apparatus 1400, the rearward part is at an acute angle relative to the surface of the apparatus 1440 as shown. The connectors in the apparatus 1400 can also be rotatable or movable, such as between different positions and/or angles.

Although FIG. 3P only depicts one side of the eyewear products display apparatus 1400, the apparatus can have other like sides. For example, the apparatus 1400 can be a one, two, three or four sided apparatus.

In still another embodiment, at least one connector of the apparatus 1400 is connected to at least one electrical component in the apparatus 1400. For example, when a selected temple part is connected to the connector, the at least one electrical component in the apparatus 1400 is electrically connected to an electrical component in the temple part, and together can perform an electrical operation.

In yet another embodiment, at least one connector of the apparatus 1400 is connected to another connector of the apparatus 1400. This allows electrical connection between the different eyewear parts connected to the apparatus 1400. For example, when a selected temple part is connected to the connector and a eyeglass frame is connected to the other connector, an electrical components within the eyeglass frame is electrically connected to an electrical component in the temple part, and together can perform an electrical operation.

Figure 4:
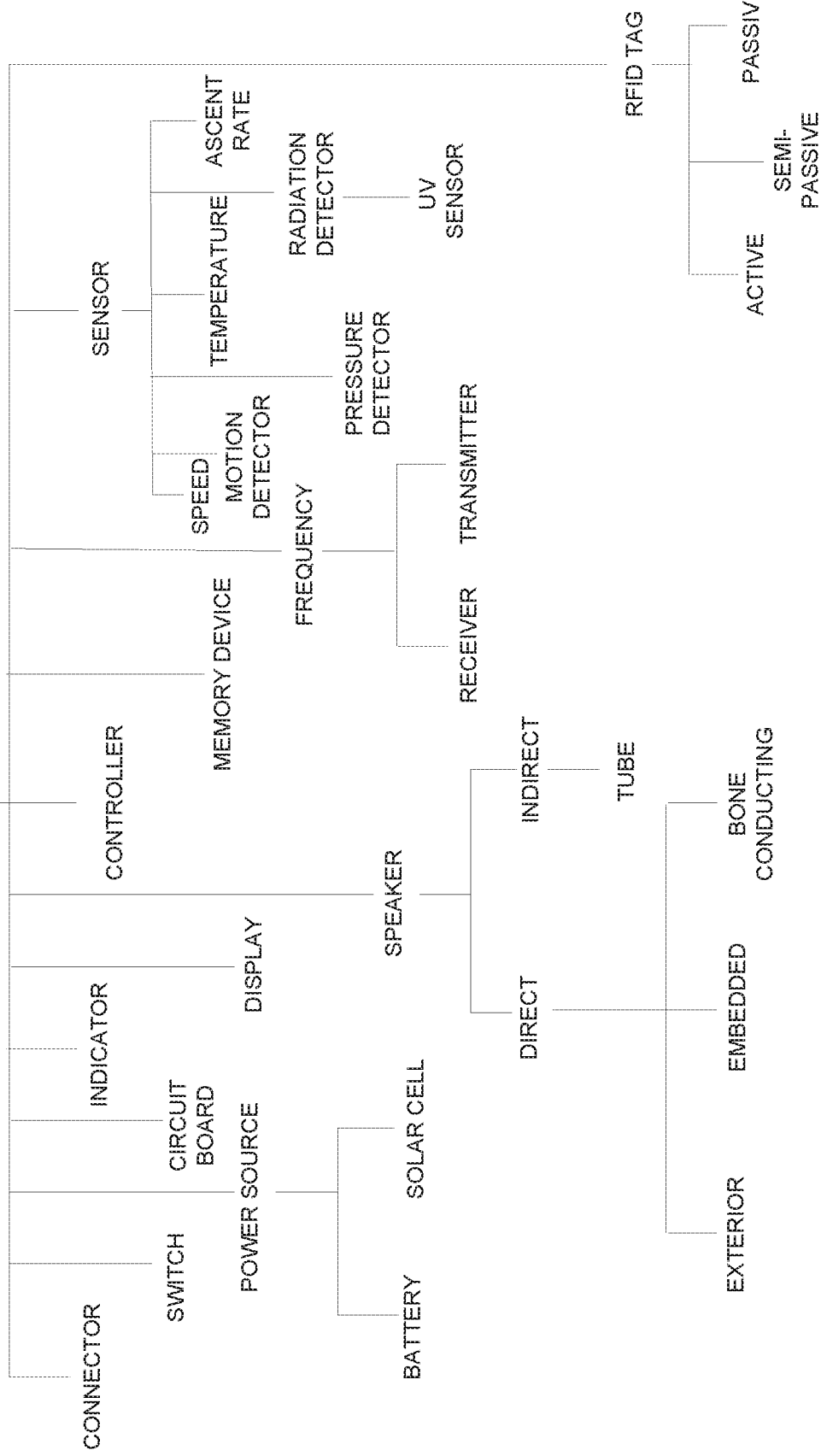
FIG. 4 shows examples of different electrical components according to the invention.

FIG. 4 shows examples of different electrical components according to the present invention. Different embodiments of temple arrangements, temple adapters or temple parts according to the invention can use one or more of these different electrical components.

In one embodiment, the electrical component is an electrical connector. The connector can be a male connector or a female connector. Examples of different types of connectors have previously been described in the related patent applications, which have been incorporated by reference.

In one embodiment, the embedded electrical component is an electrical switch, such as one or more of those previously described in the related patent applications, which have been incorporated by reference.

In one embodiment, one electrical component can be a power source. The power source can be a battery, a solar cell or other type of power source.

In one embodiment, one electrical component can include a circuit board. The circuit board can be a rigid or a flexible circuit board.

In one embodiment, one electrical component can be an indicator. The indicator can be audio, visual, or physical (e.g., vibration). For example, the indicator can signal an event or condition to a user of the glasses.

In one embodiment, one electrical component can be a display, such as a LCD display.

In one embodiment, one electrical component can be a speaker. The speaker can provide an audio output for the benefit of the wearer of the glasses. The speaker can directly transmit sound to a user, such as a speaker mounted on an exterior surface of an eyeglass frame, or partially or fully embedded in an eyeglass frame, or a bone conducting type of speaker. Alternatively, the speaker can indirectly transmit sound to a user, such as through the use of a tube to deliver audio output proximate to a user's ear.

The eyewear can contain lenses, either vision corrective lenses or non-corrective lenses. Examples of eyewear using corrective lenses include, for example, prescription glasses, bi-focal glasses, reading glasses, driving glasses, and progressive glasses. Examples of eyewear, using corrective or non-corrective lenses, are sunglasses, fit-over glasses, safety glasses, sports glasses, swim masks or goggles and ski goggles. The eyewear can also include wrap-around glasses (with wrap-around lenses), fit-over glasses, or auxiliary frames (which attach to existing frames). Still further, the eyewear can include a strap for glasses, such as a strap to hold glasses on one's head. The strap can include some or all of the components for monitoring radiation, such components can be attached or at least partially embedded in the strap.

In one embodiment, one electrical component can be a controller. The controller can, for example, be a microprocessor.

In one embodiment, one electrical component can be a memory device. The memory device can be non-volatile memory, such as FLASH memory. The data stored in the memory device can be user data or data provided by other electrical components.

In one embodiment, one electrical component is a frequency receiver or a frequency transmitter. They can be in the radio frequency range.

In one embodiment, one electrical component can be a sensor. The sensor can be a temperature sensor. The temperature sensor can be used to sense the temperature of the wearer. In one embodiment, such a temperature sensor is in a temple tip. In measuring the temperature, the user can further press the temple tip towards his head to ensure better connection. One can also put the temple under one's tongue to measure body temperature.

In other different embodiments, one electrical component can be a motion detector, a speed sensor, a rate of ascent (or descent) detector, a pressure detector, or a detector for radiation, such as an ultraviolet (UV) detector.

In one embodiment, one electrical component is a radio frequency identification (RFID) tag. A RFID tag typically includes a memory chip and a radio antenna. The memory chip usually has a small storage capacity and thus does not include a large amount of information. A portion of such information can provide identifying information for the glasses. The memory chip may only have a few kilobytes, sufficient to encode information, such as a serial number, where and when the product (such as eyeglasses) was manufactured, and other relevant information.

The RFID tags can come in a number of configurations. For example, an active tag uses a battery-powered transponder to constantly emit signals which can carry information programmed into the memory chip. Active tags are more applicable to situations where readers are not close to the tags. A semi-passive tag likewise has a battery, but may not be activated until it receives a signal from a reader. They are more applicable to situations that do not need continuous connection and accessing. A passive tag has no battery; its antenna extracts power from a reader's radio wave signal to transmit the identifying information. Passive tags are typically relatively inexpensive, but may have to be within a few feet of a reader to extract power. The electrical component can be a passive RFID tag, or some other type of tag.

In one embodiment, one electrical component can be for locating the corresponding glasses. For example, the electrical component can produce a beeping tone when it receives a specific radio signal. A handheld device (such as a key chain accessory, can generate the specific radio signal (e.g., when a button is pushed). Through the beeping tone, one can locate the glasses.

Figure 5:
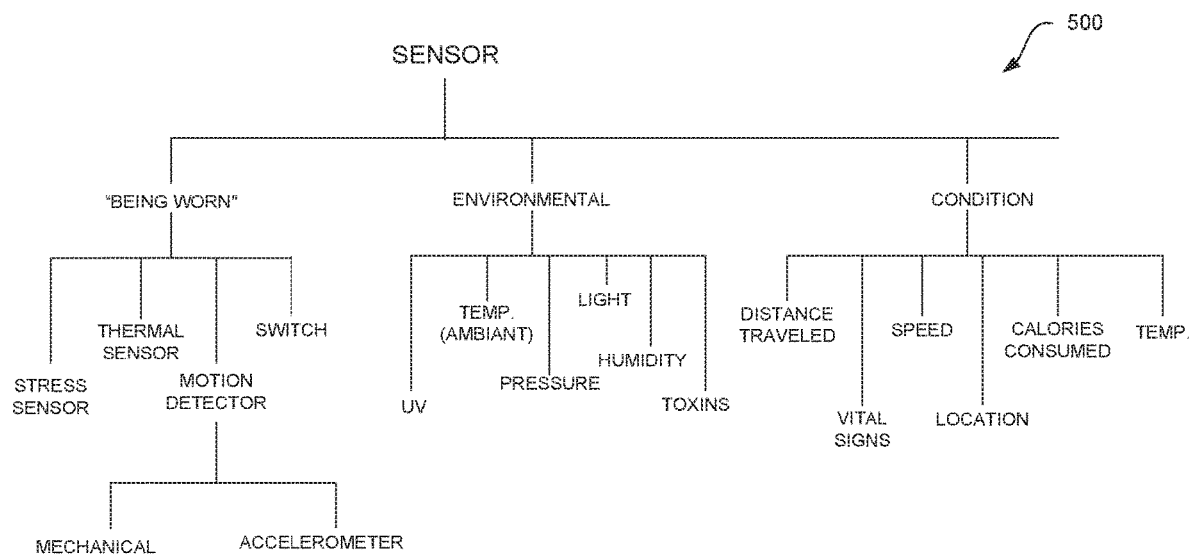
FIG. 5 is a chart that depicts examples of sensors suitable for use according to the invention.

As noted above, in one embodiment, the electrical component can be a sensor. More generally, a pair of glasses can include one or more sensors that can be used individually or in combination. FIG. 5 is a chart 500 that depicts examples of sensors suitable for use in or attached to the glasses.

In one embodiment, the sensor is a "being worn" sensor. The "being worn" sensor indicates whether the glasses are being worn by its user. The "being worn" operation can be performed using, for example, a thermal sensor, a motion detector, a stress sensor or a switch.

In one embodiment, a motion detector is used as a "being worn" sensor. A threshold can be set, such that if the amount of motion exceeds the threshold, the glasses are assumed to be worn. The motion detector can, for example, be achieved by a mechanical mechanism or an accelerometer.

In another embodiment, the "being worn" sensor includes two thermal sensors. One sensor can be at approximately the middle of a temple, such as in a region that touches the head of the user wearing the glasses. The other sensor can be at one end of the temple, the end that is close to its hinge. If the temperature differential between the two sensors is beyond a certain preset value, the glasses would be assumed to be worn. The differential is presumed to be caused by a person wearing the pair of glasses.

In yet another embodiment, the "being worn" sensor includes a stress sensor at the hinge of the temple. The assumption is that when the eyewear is worn, the hinge is typically slightly stretched because typically, the width of the head of the user is slightly wider than the width between the temples when the two temples are in the extended positions. If the value of the stress sensor is beyond a certain preset value, the glasses would be assumed to be worn.

In a further embodiment, the "being worn" sensor can be a switch. For example, at the hinge between a temple and its corresponding lens holder, there is a switch. When that temple is in its extended position, i.e., fully extended outwards, the switch is turned on. The switch can be a pin-type switch. When the temple is fully extended outwards, the pin is pressed. When both temples are fully extended outwards, in one embodiment, the glasses would be assumed to be worn by the user.

In one embodiment, another type of sensor is an environmental sensor. The environmental sensor can sense environmental conditions, such as one or more of radiation (e.g., ultraviolet radiation or light), temperature (e.g., ambient temperature), pressure, humidity and toxins (e.g., chemicals, etc.).

In another embodiment, another type of sensor is a condition sensor. The condition sensor can sense the conditions of the user of the glasses. Examples of condition sensors include sensing one or more of distance traveled, location, speed, calories consumed, temperature and vital signs associated with the user of the glasses. The distance traveled could represent the horizontal distance traveled or the vertical distance (i.e., elevation) traveled. The speed can be the rate of movement along the horizontal distance traveled and/or the vertical distance. In yet another embodiment, the condition sensor can indirectly sense emotional conditions of the user of the glasses.

The sensors can be provided in a redundant or fault-tolerant manner. For example, sensors can come in pairs in the glasses. When one malfunctions, the other one will take over its operation. In another embodiment, the sensor information can be processed in a differential manner to examine changes to the sensor information. The differential can be based on time. The sensors can be powered by a battery, solar energy, or kinetic energy. For reduced power consumption, the sensors can remain in a low-power state unless data is being acquired by the sensors. In yet another embodiment, two or more of the sensors can communicate with one another (wired or wirelessly) to exchange data or control information.

Figure 6:
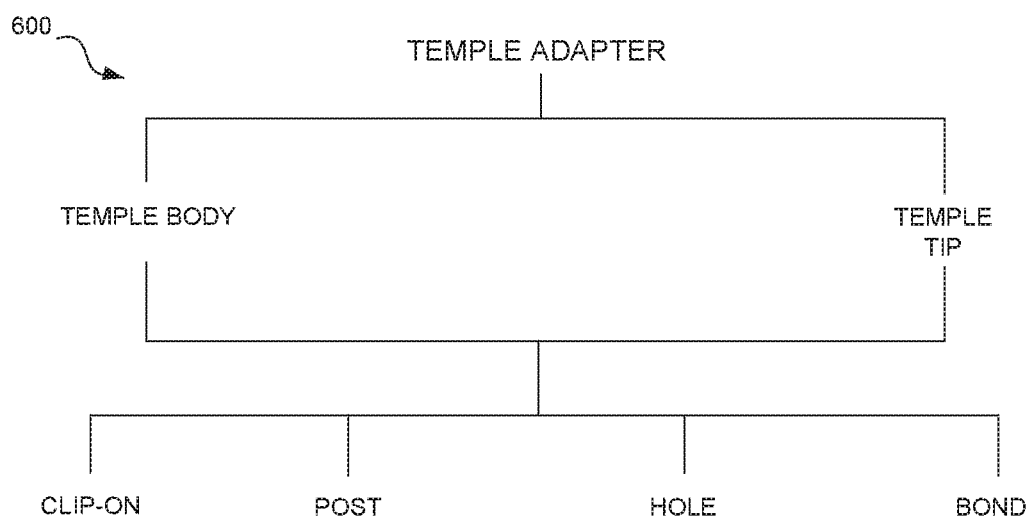
FIG. 6 illustrates a diagram of a number of different embodiments of temple adapters according to the invention.

FIG. 6 illustrates a diagram of a number of different embodiments of temple adapters 600 according to the invention. The temple adapters 600 serve to adapt a temple (i.e., a temple body or temple tip) of a pair of eyeglasses to provide for at least one electrical component. In one embodiment, a temple adapter can clip onto a temple body or a temple tip. In another embodiment, a temple adapter can mount to a post provided on a temple body or a temple tip. In still another embodiment, a temple adapter can mount to a hole provided in a temple body or a temple tip. In yet another embodiment, a temple adapter can be bonded (or adhered) to a temple body or a temple tip.

The temple adapter is particularly well suited to adapt a pair of eyeglasses with communication components, such as a speaker and/or a microphone. As an example, a standard pair of eyeglasses can be transformed into an operational headset by attaching a temple adapter to a temple body or temple tip of the pair of eyeglasses, wherein the temple adapter includes at least one speaker and at least one microphone.

The temple adapter can be rigid or malleable. The benefit of being malleable is that the particular geometric arrangement/assembly of the temple adapter can be altered by its user for better user comfort or operation.

In one embodiment, the temple adapter is a structure that has at least one electrical component attached thereto or at least partially embedded therein. In another embodiment, all of the electrical components to be provided with the temple adapter are at least partially embedded in the temple adapter.

Figure 7A:
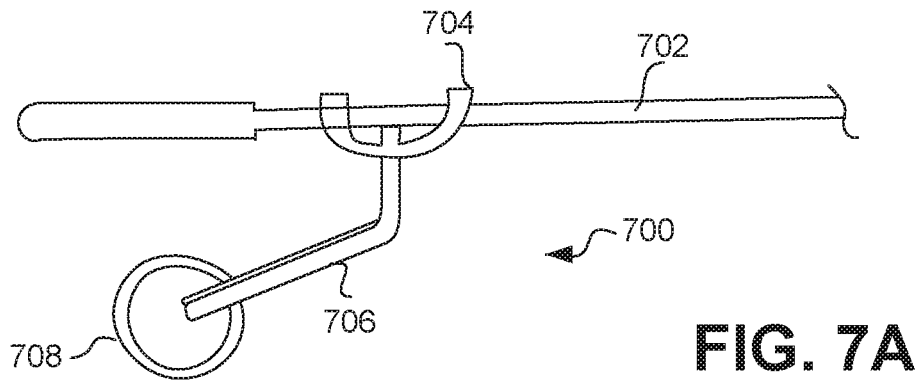
FIG. 7A is a diagram of a temple adapter according to one embodiment of the invention.

FIG. 7A is a diagram of a temple adapter 700 according to one embodiment of the invention. The temple adapter 700 attaches to a temple 702 (including any temple tip using a clip 704. The clip 704 can use force, such as an interference fit force or spring-induced force, to attach the temple adapter 700 to the temple 702. Besides the clip 704, the temple adapter 700 includes an angled arm 706 and an ear bud 708. The angled arm 706 can be malleable. When a pair of eyeglasses associated with the temple 702 is being worn by a user, the ear bud 708 can be placed in or near the user's ear canal. The ear bud 708 contains a speaker and receives electrical signals via a wire, such wire can be provided internal or external to the temple adapter 700 and can originate at the temple 702 or external to the temple 702.

Figure 7B:
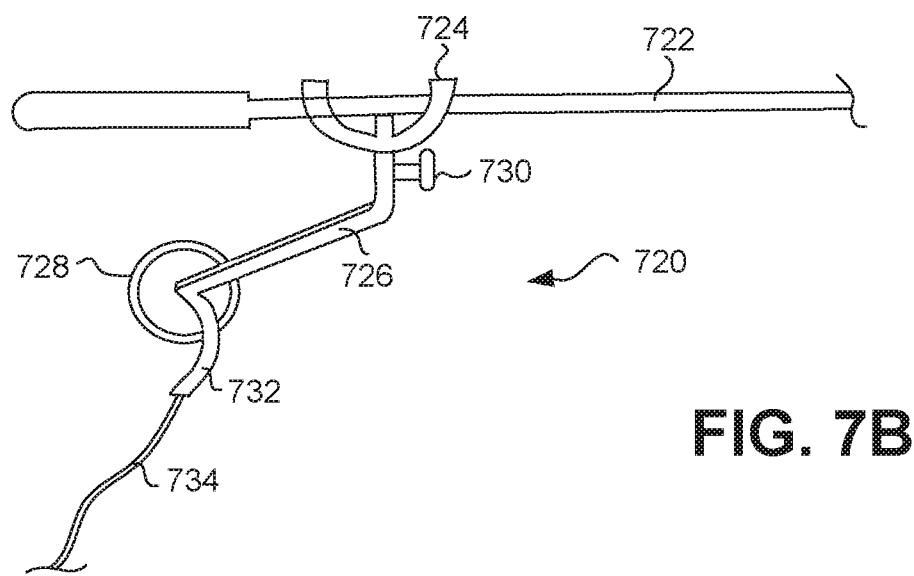
FIG. 7B is a diagram of a temple adapter according to another embodiment of the invention.

FIG. 7B is a diagram of a temple adapter 720 according to another embodiment of the invention. The temple adapter 720 attaches to a temple 722 (including any temple tip) using a clip 724. The clip 724 can use force, such as an interference fit force or spring-induced force, to hold the temple adapter 720 to the temple 722. Besides the clip 724, the temple adapter 720 includes an angled arm 726, an ear bud 728, a microphone 730, an extension arm 732 and a cord 734. In this embodiment, the cord 734 includes a wire that connects to the speaker within the ear bud 728 and another wire that connects to the microphone 730. There can be one or more conductors inside a given wire. For example, a wire might have one conductor serving as a signal line and another conductor serving as ground. Such wires can be provided internal to the extension arm 732 and the angled arm 726. The arm 732 can serve to guide the cord 734 away from the user's ear or rearward. The angled arm 726 can be malleable. The placement or position of the microphone 730 can vary with implementation. As shown in FIG. 7B, the microphone 730 is directed forward to a user's front when a pair of eyeglasses associated with the temple 722 are being worn. Alternatively, the microphone 730 could be directed outward away from the user's head when the pair of eyeglasses are being worn. When a pair of eyeglasses associated with the temple 722 is being worn by a user, the ear bud 728 can be placed in or near the user's ear canal. The ear bud 728 contains a speaker and receives electrical signals via a wire of the cord 734. The cord 734 can have another end (not shown) with a connector for coupling with an audio output device (e.g., radio, MP3 player) or a communication device (e.g., mobile phone).

Figure 8A:
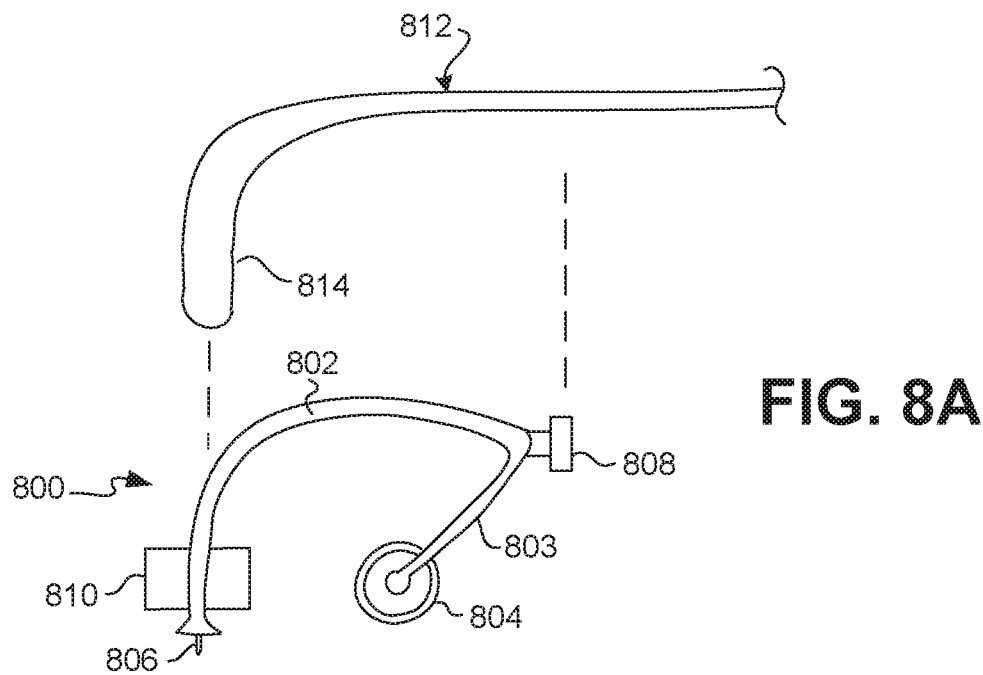
FIGS. 8A and 8B are diagrams of a temple adapter according to another embodiment of the invention.
Figure 8B:
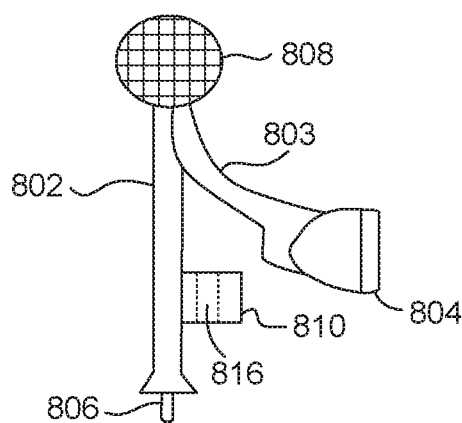

FIGS. 8A and 8B are diagrams of a temple adapter 800 according to another embodiment of the invention. FIG. 8A is a side view of the temple adapter 800, and FIG. 8B is a front view of the temple adapter 800. The temple adapter 800 has a support body 802 which has a support arm 803. An ear bud 804 is attached to an end of the support arm 803. A connector 806, such as a male audio connector, is attached to one end of the support body 802. A microphone 808 can be optionally provided and attached to the support body 802 or the support arm 803. Additionally, an elastic member 810 can be provided to facilitate attachment of the support body 802 to a temple 812 of a pair of eyeglasses. The temple 812 can have a tip region 814, which can be referred to as a temple tip. When the temple adapter 800 is attached to the tip region 814 of the temple 812, the tip region 814 is placed in or through an opening 816 in the elastic member 810, as shown, for example, in FIG. 8B. The temple adapter 800 is thereby held in place relative to the tip region 814. Additionally, although not shown, the support body 802 would carry a first internal wire from the connector 806 to the microphone 808, and the support body 802 and the support arm 803 would carry a second internal wire from the connector 806 to the ear bud 804.

Figure 9A:
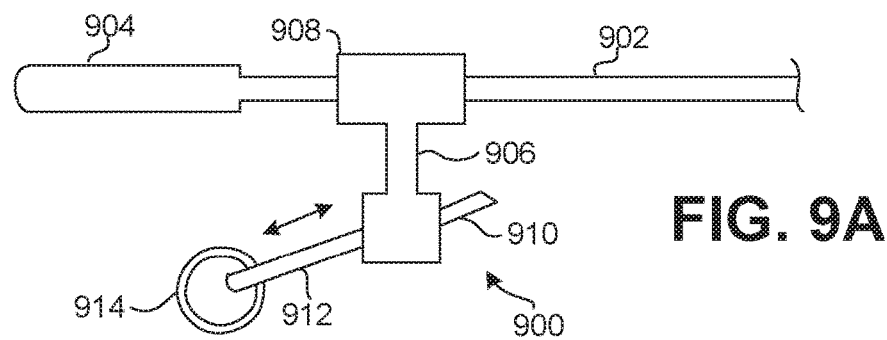
FIG. 9A is a diagram of a temple adapter according to one embodiment of the invention.

FIG. 9A is a diagram of a temple adapter 900 according to another embodiment of the invention. In FIG. 9A, a side-view of the temple adapter 900 is depicted. The temple adapter 900 attaches to a temple 902 of a pair of eyeglasses. The temple 902 can have a tip region 904, which can be referred to as a temple tip. The temple adapter 900 has a support member 906. A first end 908 of the support member 906 couples to the temple 902 of a pair of eyeglasses. In one embodiment, the first end 908 serves to attach the temple adapter 900 to the temple 902. For example, the first end 908 can provide a clip, clamp, post, or hole to provide or assist with the attachment. As another example, the first end 908 can alternatively or additionally use an adhesive, bonding or fastener (e.g., hook and loop system, such as Velcro) to provide or assist with the attachment. A second end 910 of the support member 906 provides an opening through which an arm 912 extends. One end of the arm 912 has an ear bud 914 attached thereto. The arm 912 can be angled and/or malleable. When a pair of eyeglasses associated with the temple 902 is being worn by a user, the ear bud 914 can be placed in or near the user's ear canal. The ear bud 914 contains a speaker and receives electrical signals via a wire, such wire can be provided internal or external to the temple adapter 900 and can originate at the temple 902 or external to the temple 902.

Figure 9B:
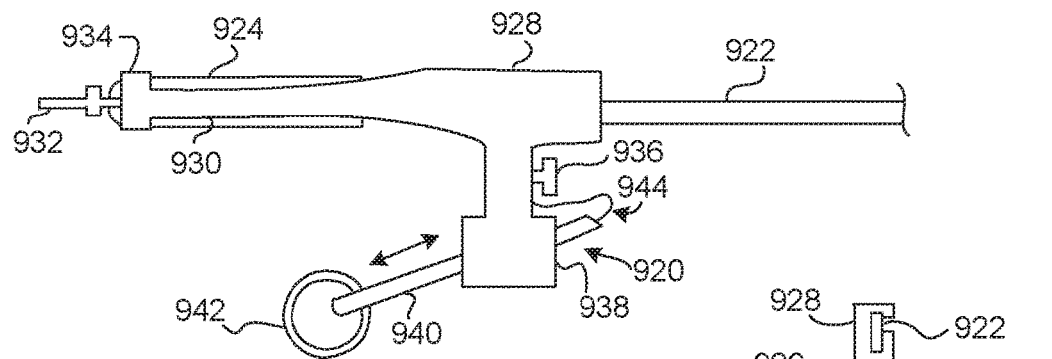
FIGS. 9B and 9C are diagrams of a temple adapter according to another embodiment of the invention.
Figure 9C:
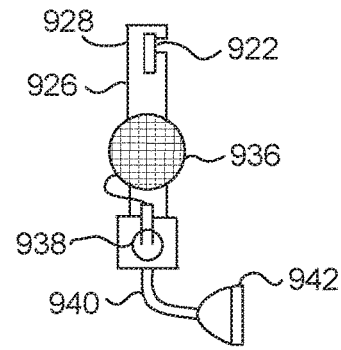

FIGS. 9B and 9C are diagrams of a temple adapter 920 according to still another embodiment of the invention. FIG. 9B is a side view of the temple adapter 920, and FIG. 9C is a front view of the temple adapter 920. The temple adapter 920 attaches to a temple 922 of a pair of eyeglasses. The temple 922 can have a tip region 924, which can be referred to as a temple tip. The temple adapter 920 has a support member 926. A first end 928 of the support member 926 couples to the temple 922 of a pair of eyeglasses. In one embodiment, the first end 928 serves to attach the temple adapter 920 to the temple 922. For example, the first end 928 can provide a clip, clamp, post, or hole to provide or assist with the attachment. As another example, the first end 928 can alternatively or additionally use an adhesive, bonding or fastener (e.g., hook and loop system, e.g., Velcro) to provide or assist with the attachment. The first end 928 also has a bracket 930 having a connector 932 at one end, and an elastic member 934 for coupling about the tip region 924. The connector 932, such as a male audio connector, is attached to one end of the bracket 930. A microphone 936 can be optionally provided and, for example, attached to the support body 926.

A second end 938 of the support member 926 provides an opening through which an arm 940 extends. One end of the arm 940 has an ear bud 942 attached thereto. The arm 940 can be angled and/or malleable. The arm 940 is also re-positionable within the opening at the second end 938 so as to permit user adjustment. When a pair of eyeglasses associated with the temple 922 is being worn by a user, the ear bud 942 can be placed in or near the user's ear canal. The ear bud 942 contains a speaker and receives electrical signals via a wire, such wire can be provided internal or external to the temple adapter 920 and can originate at the temple 902 or external to the temple 902. In this embodiment, a wire 944 is shown as passing through the arm 940 to provide signals to the speaker within the ear bud 942. More particularly, in one embodiment, although not shown in FIGS. 9B and 9C, a first wire would connect the speaker within the ear bud 942 to the connector 932 (e.g., wire 944), and a second wire would connect the microphone 936 to the connector 932. Such wires can be internal or external, or partially internal and partially external, to the temple adapter 920.

Figure 9D:
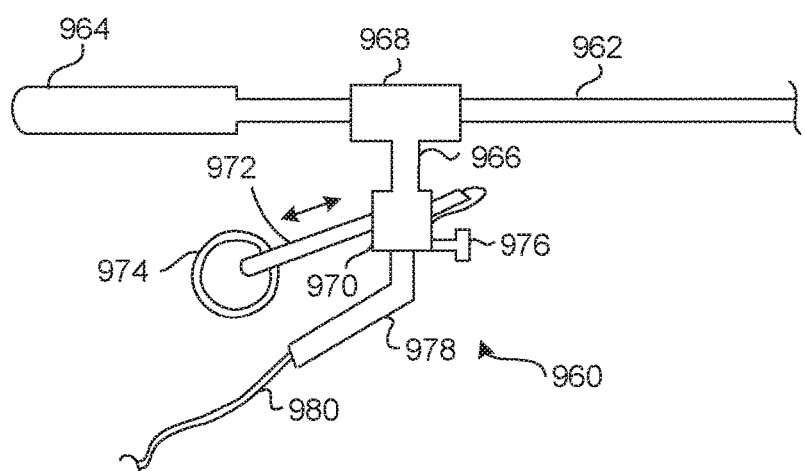
FIG. 9D is a diagram of a temple adapter according to still another embodiment of the invention.

FIG. 9D is a diagram of a temple adapter 960 according to still another embodiment of the invention. In FIG. 9D, a side-view of the temple adapter 960 is depicted. The temple adapter 960 attaches to a temple 962 of a pair of eyeglasses. The temple 962 can have a tip region 964, which can be referred to as a temple tip. The temple adapter 900 has a support member 966. A first end 968 of the support member 966 couples to the temple 962 of a pair of eyeglasses. In one embodiment, the first end 968 serves to attach the temple adapter 960 to the temple 962. For example, the first end 968 can provide a clip, clamp, post, or hole to provide or assist with the attachment. As another example, the first end 968 can alternatively or additionally use an adhesive, bonding or fastener (e.g., hook and loop system, e.g., Velcro) to provide or assist with the attachment. A second end 970 of the support member 906 provides an opening through which an arm 972 extends. One end of the arm 972 has an ear bud 974 attached thereto. The arm 972 can be angled and/or malleable. When a pair of eyeglasses associated with the temple 962 is being worn by a user, the ear bud 974 can be placed in or near the user's ear canal. The ear bud 974 contains a speaker and receives electrical signals via a wire, such wire can be provided internal or external to the temple adapter 960 and can originate at the temple 962 or external to the temple 962. Further, the temple adapter 960 can include a microphone 976. In this embodiment, the microphone 976 is attached to the support member 966. In addition, an arm 978 is used to support an end of a cable 980 that is coupled to the arm 978. The cable 980 can include at least one wire for the microphone 976 and one wire for the speaker within the ear bud 974.

To the extent that any of the embodiments of the temple adapters discussed above use a microphone, a tube can be optionally attached to the microphone to facilitate voice pick-up of the user. One end of the tube can be placed over the microphone, and the other end of the tube is then positioned closer to the user's mouth than is the microphone. With a temple adapter on both temples, each providing a microphone and speaker to a pair of eyeglasses, only one temple adapter would typically make use of such a tube. Alternatively, the tube and the microphone could be replaced by a boom microphone.

Figure 10A:
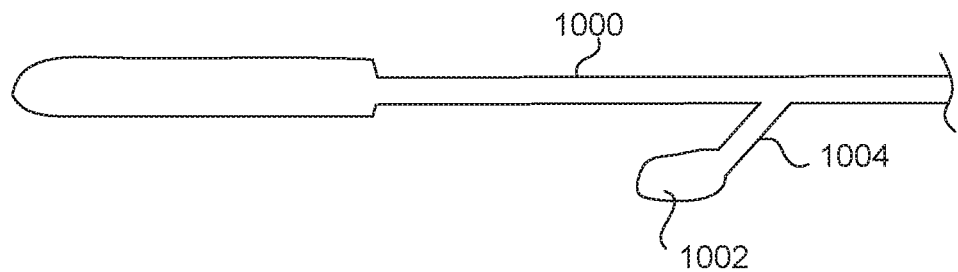
FIGS. 10A-10C are diagrams of a temple having a bone conducting element according to still other embodiments of the invention.
Figure 10B:
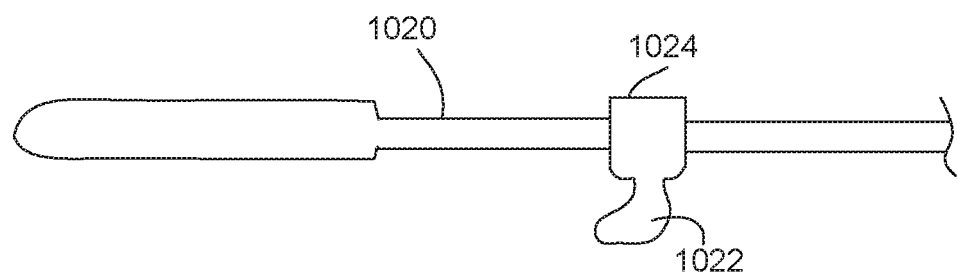
Figure 10C:
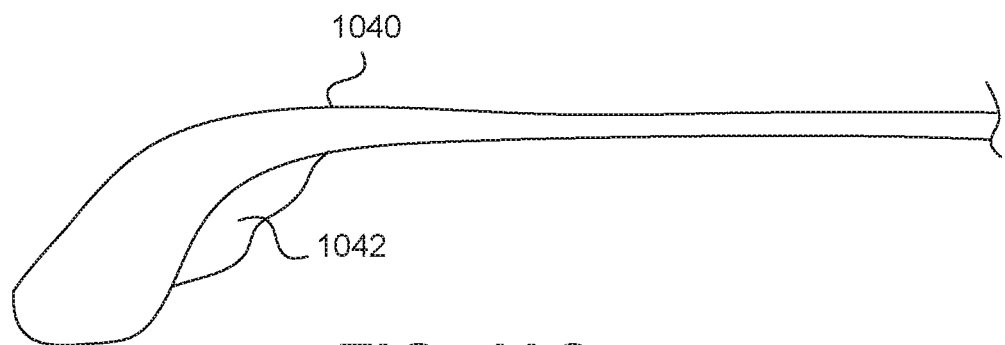

FIG. 10A-10C are diagrams of a temple having a bone conducting element according to still other embodiments of the invention. The bone conducting elements can replace a traditional speaker to provide audio output to a user. Although not shown, electrical signals would be internally or externally supplied to the bone conducting element.

FIG. 10A illustrates a temple 1000 for a pair of eyeglasses. The temple 1000 includes a bone conducting element 1002 that can provide audio sound to a user by coupling vibrations to at least one bone of the user's face. The bone conducting element 1002 is held relative to the temple 1000 by an arm 1004. Hence, in this embodiment, the temple 1000, the arm 1004 and the bone conducting element 1002 can all be integrally formed.

FIG. 10B illustrates a temple 1020 for a pair of eyeglasses. The temple 1020 includes a bone conducting element 1022 that can provide audio sound to a user by coupling vibrations to at least one bone of the user's face. The bone conducting element 1022 is held relative to the temple 1020 by a support 1024 that removably attaches to the temple 1020.

FIG. 10C illustrates a temple 1040 for a pair of eyeglasses. The temple 1040 includes a bone conducting element 1042 that can provide audio sound to a user by coupling vibrations to at least one bone of the user's head. In this embodiment, the bone conducting element 1042 is positioned in the vicinity of the user's ear, such as behind the user's ear. The placement of the bone conducting element 1042 in this embodiment can reduce impact to the design of the eyeglasses.

In one embodiment, the electrical components associated with a temple arrangement, a temple adapter or a removable temple part is for enhancing the hearing of the person wearing the corresponding pair of glasses. There can be at least a microphone and a speaker in a temple arrangement, a temple adapter or removable temple part. The microphone can be close to an ear of the user when the glasses are worn by the user, and can be a directional microphone. The microphones can be a microphone in a temple adapter, such as the microphone 730 in FIG. 7B, 808 in FIG. 8A, 936 in FIG. 9B, or 976 in FIG. 9D. The microphones can be in a temple arrangement. The microphone in a temple arrangement can be attached to a temple tip, a temple fit-over or a temple cover. The microphones can be positioned to be in front of the user's ears so that the microphones will not be affected by the shadowing effect of the ears. The speaker can be inserted into the ear, as in some of the speakers previously described.

In another embodiment, there are two sets of microphones and speakers, such as in two temple arrangements, temple adapters or removable temple part. In the vicinity of each ear, there is a temple arrangement, temple adapter or removable temple part with its corresponding microphone and speaker. The microphones again can be directional, one pointing generally outwards in a position close to the left ear, and one pointing generally outwards in a position close to the right ear. Alternatively, the microphones can point forward.

The microphone and the speaker close to an ear do not have to be in very close proximity to each other, as in many hearing aids existing nowadays. They can be spaced apart by, such as, one to several inches, with the microphone being directional and pointing to the front and to either the left or the right of the user, and with the speaker pointing toward or inserted into the corresponding ear of the user. Such a distance apart can significantly reduce feedback effect of existing hearing aids. Another advantage of such a hearing enhancement device is that users may not need to be fitted into ears with ear molds. In any case, additional details on hearing enhancement are further described in the related applications that have been incorporated herein by reference, such as U.S. Provisional Patent Application No. 60/620,238, filed Oct. 18, 2004, and entitled "EYE-GLASSES WITH HEARING ENHANCED AND OTHER AUDIO SIGNAL-GENERATING CAPABILITIES."

The various embodiments of the invention noted above, whether temple arrangement, temple adapter or removable temple part, can have a cable or cord attached or attachable thereto. The cable or cord has one or more conductors. The cable or cord can serve to provide electrical signals to or receive electrical signals from the temple arrangement, the temple adapter or removable temple part. In one embodiment, one end of a cable or cord attaches to a temple arrangement, temple adapter or removable temple part (either permanently or via a connector) and the other end of the cable or cord attaches (either permanently or via a connector) to an electronic device. As an example, the electronic device can be an audio output device (e.g., audio player) or a communication device (e.g., mobile telephone). In a first example, the cable or cord could provide a male audio (stereo) connector at one end, and a pair of female audio connectors at the opposite end, each being for use with a different temple. In a second example, the cable or cord could provide a set of connectors, such as a male mini-phone connector (2.5 mm) and a male audio (stereo) connector, at one end, and one or a pair of female phone connectors at the opposite end.

In one embodiment, the cable or cord can also have a switch coupled thereto so as to permit a user to switch modes. For example, if the temple arrangement, temple adapter or removable temple part provides a speaker and microphone to a pair of eyeglasses, a switch on a cable or cord that connects the temple arrangement or temple adapter to an electronic device could provide different switch positions for different electronic devices or different functional modes of operation of a single electronic device. As an example, if the electronic device is (or operates as) an audio player, a first switch position could be used. Alternatively, if the electronic device is (or operates as) a mobile telephone, a second switch position could be used. Additional discussion of suitable cables and cords is provided in the related applications that have been incorporated herein by reference.

Electrical components can form an electronic module. The electronic module can provide radiation monitoring, wireless communication, enhanced hearing, etc. A radiation monitoring system can be partially or fully contained in a temple arrangement, temple adapter or removable temple part associated with a temple of a pair of glasses. Typically, the temple arrangement or temple adapter can be removable from the temple. The removable temple part is obviously removable from a corresponding remaining temple part.

In another embodiment, an electronic component in a temple arrangement, temple adapter or removable temple part interacts with another electronic component in another part (e.g., frame) of the glasses or in a device tethered to the glasses. For example, a temple of a pair of glasses holds one portion of an electronic circuit. That portion can include generic parts, such as a battery, that are applicable to different applications. Another portion of the electronic circuit is in a temple arrangement, temple adapter or removable temple part. This portion can be application specific, such as an electronic clock without a battery, or a temperature sensor.

In yet another embodiment, the electrical components can provide audio player capabilities. In such an embodiment, the electrical components can include audio file storage, an audio player and a battery. The electrical components may or may not include wireless communication circuitry.

Further, in an alternative embodiment, the output of an operation indicator can be audio. The audio output can be from one or more speakers associated with the frame of the eyeglasses. Such audio output can signal the user using natural language, voice synthesis, pre-recorded messages, etc.

In another embodiment, the electrical components can include a memory module. The memory module provides non-volatile data storage. For example, the memory module can be a portable (or removable) memory device (e.g., memory card). The memory module can, for example, store sensor information (which can be over an extended period of time). Such memory module can be remotely interrogated using wireless communication circuitry, or can be accessed through a wired connection with a tethered device.

In one embodiment, the electrical connection(s) can alternatively be used to allow information stored in the electrical components to be accessed or queried by a device. For example, when the electrical components include a memory module, the memory module can be accessed to read data (e.g., status information) stored therein.

As previously noted, the electrical components associated with a temple arrangement, a temple adapter and/or removable temple part can pertain to radiation monitoring circuitry. In such case, the electrical components within the temple arrangement, temple adapter or removable temple part alone or together with eyeglass electrical components can implement a radiation monitoring system. The radiation being monitored can, for example, pertain to one or more of UV, infrared and gamma radiation. In one embodiment, sunlight is considered as a type of radiation. In any case, additional details on radiation monitoring are further described in the related applications that have been incorporated herein by reference.

Also, the electrical components can pertain to health or fitness monitoring circuitry. In such case, the electrical components within the temple arrangement, the temple adapter removable temple part alone or together with eyeglass electrical components can implement a health or fitness monitoring system. Additional details on health or fitness monitoring are further described in the related applications that have been incorporated herein by reference.

In yet another embodiment, an electronic component in a temple arrangement, a temple adapter or removable temple part of a frame of eyeglasses interacts with an electronic component of an apparatus tethered to the eyeglasses to perform an operation. For example, a temple arrangement, a temple adapter removable temple part of a pair of eyeglasses holds one portion of an electronic system, and a tethered apparatus that tethers to the pair of eyeglasses includes another portion of the electronic system.

Still further, the invention can provide a new approach to marketing accessories, namely, electrical accessories, for eyewear. According to one method for providing temple arrangements, temple adapters and/or removable temple part for use with a pair of glasses, the method can initially provide a plurality of temple arrangements, temple adapters and/or removable temple part for a customer. This enables the customer to browse and select at least one temple arrangement, temple adapter or removable temple part. Each of the temple arrangements, temple adapters or removable temple part can have one or more electrical components at least partially embedded therein, with different temple arrangements, temple adapters or removable temple parts providing different electrical capabilities. Once a temple arrangement, temple adapter or removable temple part has been selected, the selected temple arrangement, temple adapter or removable temple part can be coupled to one of the corresponding temples of the eyewear (e.g., a pair of glasses). In the case where the selected temple arrangement is a temple tip, the selected temple tip is inserted onto (e.g., slid over) an end of the corresponding temple (after removing any previously installed temple tip if there was one). In the case where the selected temple adapter is to be coupled, the selected temple adapter can be attached to the corresponding temple. In the case where the selected removable temple part is to be coupled, the selected removable temple part can be attached to a remaining part (e.g., forward part) of the corresponding temple. Thereafter, the customer can make use of the eyewear with its associated electrical capabilities provided by the temple arrangement, temple adapters or removable temple part.

In one embodiment, once a temple arrangement, a temple adapter and/or removable temple part is provided to a customer, the customer can test the electrical capabilities of the pair of glasses. If the customer does not like the current selected temple arrangement, temple adapter or removable temple part, the customer can repeat the process by selecting and testing another temple arrangement, temple adapter or removable temple part. Before providing the eyewear with the temple arrangement, temple adapter or removable temple part, the customer can be required to pay a purchase (or rental) price for at least the temple arrangement, temple adapter or removable temple part. Thereafter, the customer can be permitted to return and replace the temple arrangement, temple adapter or removable temple part with another temple arrangement, temple adapter or removable temple part. Such returns or replacements can be available only for a limited period of time following their purchase.

Yet still another aspect of the invention relates to eyewear having an extended endpiece so as to facilitate placement of one or more electrical components at the extended endpiece. In one embodiment, a conventional pair of glasses has two endpieces, one on its left and the other on its right side of the frame. For example, the left endpiece is the region of the frame approximately between the left hinge (or joint) and the left lens holder of the frame. Similarly, the right endpiece is the region of the frame approximately between the right hinge (or joint) and the right lens holder of the frame.

The one or more electrical components at an extended endpiece can operate independently or together with other electrical components provided elsewhere. For example, other electrical components can be provided in other regions of the frame for the eyewear. In another example, the other electrical components can be located in a bridge area of the frame for the eyewear. In such an example, given that the endpiece is extended, the one or more electrical components can be placed at the endpiece and thereby communicate with other electrical components in a front area (e.g., lens holder region or bridge region) or the other endpiece (which can also be extended) without having to communicate through a hinge or connector.

Figure 11A:
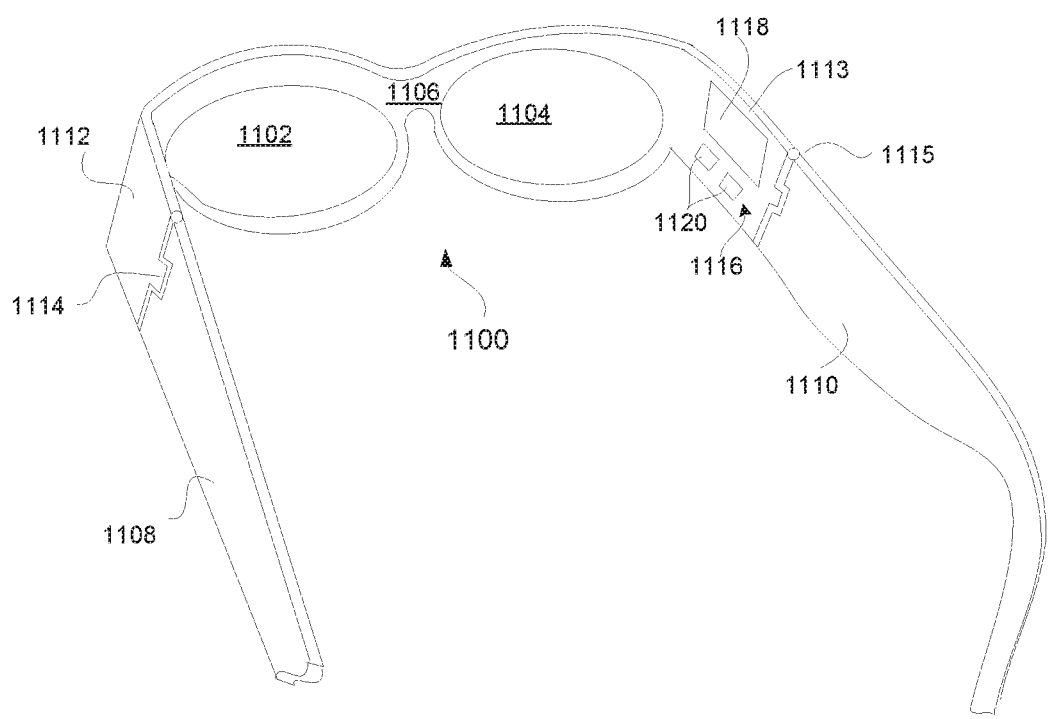
FIG. 11A illustrates a pair of glasses according to one embodiment of the invention.

FIG. 11A illustrates a pair of glasses 1100 according to one embodiment of the invention. The pair of glasses 1100 includes a first lens holder 1102 and a second lens holder 1104. The lens holders 1102 and 1104 are capable of receiving lenses. The lenses can be prescription lenses or non-prescription lenses. The first lens holder 1102 has a first side and a second side. The second lens holder 1104 has a first side and a second side. The pair of glasses 1100 also has a bridge 1106 in between the first lens holder 1102 and the second lens holder 1104. The bridge 1106 is coupled to the second side of the first lens holder 1102 and the first side of the second lens holder 1104. The lens holders 1102 and 1104 and the bridge 1106 can be separate pieces or a single integral piece. The glasses 1100 can also be referred to as eyeglasses.

The pair of glasses 1100 also includes a first extended endpiece 1112 and a second extended endpiece 1113. In addition, the pair of glasses 1100 includes a pair of temples, namely, a first temple 1108 and a second temple 1110. The first extended endpiece 1112 connects to the first temple 1108 via a joint (or hinge) 1114. The second extended endpiece 1113 connects to the second temple 1110 via a joint (or hinge) 1115. In one embodiment, the extended endpieces 1112 and 1113 are larger as compared to conventional endpieces. As a result, the respective joints (or hinges) 1114 and 1115 are set back from the respective lens holders 1102 and 1104. For example, in one embodiment, the hinge 1115 is set back from the lens holder 1104 by about 1 to 5 centimeters. One advantage of utilizing enlarged (or extended) endpieces 1112 and 1113 as illustrated in FIG.

11A is that electrical components 1116 are able to be comfortably provided in the extended endpieces 1112 and 1113. Moreover, another advantage is that the electrical components 1116 within the extended endpiece 1113 can electrically couple to other electrical components provided within the forward portion or front area of the frame without having to electrically connect through a joint or hinge. As illustrated in FIG. 11A, the extended endpiece 1113 provides electrical components 1116 with at least a portion at an inner surface of the extended endpiece 1113. The electrical components 1116, in this example, include a display 1118 and a plurality of switches 1120 (e.g., buttons). As an example, the electrical components 1116 can, for example, implement an electrical system (e.g., pedometer system, UV monitoring system, or other physical condition monitoring system, etc.). In the embodiment of the glasses 1100 illustrated in FIG. 11A, the electrical components 1116 are provided in the extended endpiece 1113.

Figure 11B:
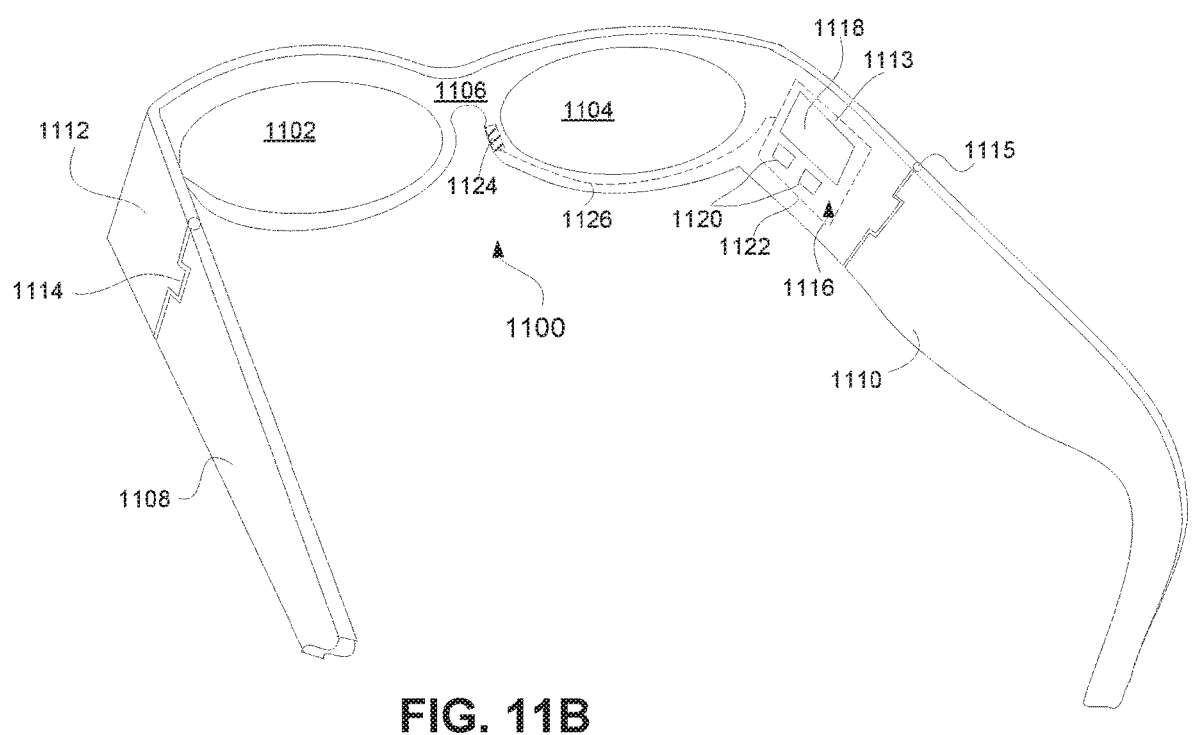
FIG. 11B illustrates a pair of glasses according to another embodiment of the invention.

FIG. 11B illustrates the pair of glasses 1100 according to another embodiment of the invention. More particularly, FIG. 11B illustrates the pair of glasses 1100 illustrated in FIG. 11A where the electrical components 1116 are provided as a module 1122 embedded internal to the extended endpiece 1113. The module 1122 includes a plurality of interconnected electrical components, including the display 1118 and the switches 1120. In addition, the glasses 1100 further include a separate electrical component 1124. As illustrated in FIG. 11B, the separate electrical component 1124 can be provided at the bridge 1106. Still further, a conductive element (e.g., a wire) that electrically connects the module 1122 with the separate electrical component 1124 can be provided internal to the eyeglass frame, such as internal to the lens holder of 1104. The nature of the separate electrical component 1124 can vary depending upon application. In the case in which the module 1122 pertains to a pedometer or health system, the separate electrical component 1124 can pertain to a sensor used to measure the heart rate of the user of the glasses 1100. For additional details on a sensor utilized in this context, see U.S. Provisional Patent Application No. 60/787,850, filed Apr. 1, 2006, and entitled "EYEGLASSES WITH HEART RATE MONITOR," which is hereby incorporated herein by reference. Although not illustrated in FIG. 11B, the extended end piece 1113 can also include a cavity (or opening) and a cover or a door. The module 1122 can be inserted or removed from the cavity by way of the cover or door.

Figure 12A:
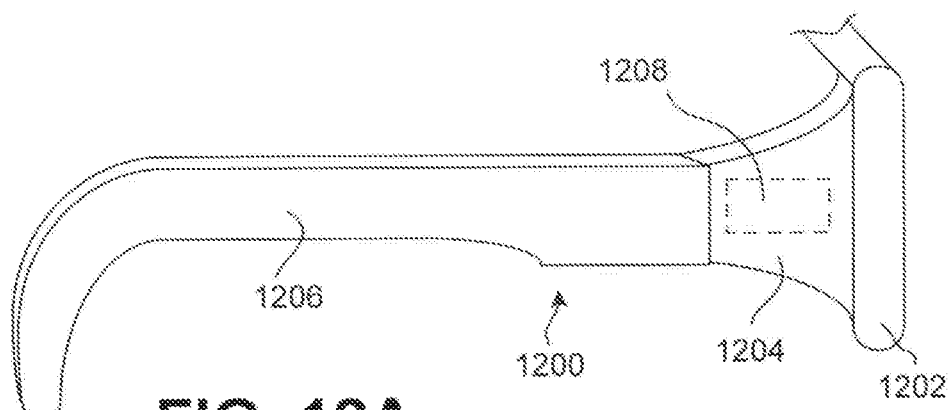
FIGS. 12A-12E illustrate a side view of eyeglass frames having an extended temples according to several embodiment of the invention.

FIGS. 12A-12E illustrate a side view of eyeglass frames having an extended temples according to several embodiment of the invention. In FIG. 12A, a side view of an eyeglass frame 1200 includes a lens holder (or a region immediately proximate to a lens holder) 1202, an extended endpiece 1204 and a temple 1206. The extended endpiece 1204 includes one or more electrical components 1208 partially or completely internal to the extended endpiece 1204. In this embodiment, the manner by which the temple 1206 connects to the extended endpiece 1204 is not depicted. Hence, the temple 1206 can be integral with the extended endpiece 1200, can be permanently coupled to the extended endpiece 1204, or can be removably or pivotally coupled to the extended endpiece 1204.

Figure 12B:
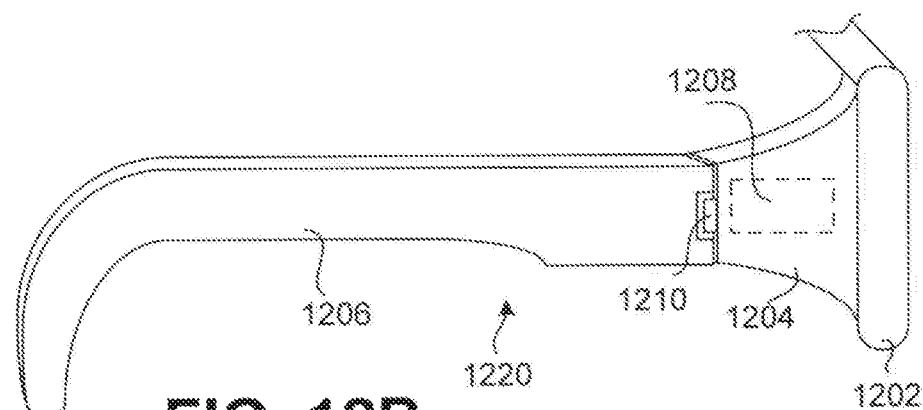
Figure 12C:
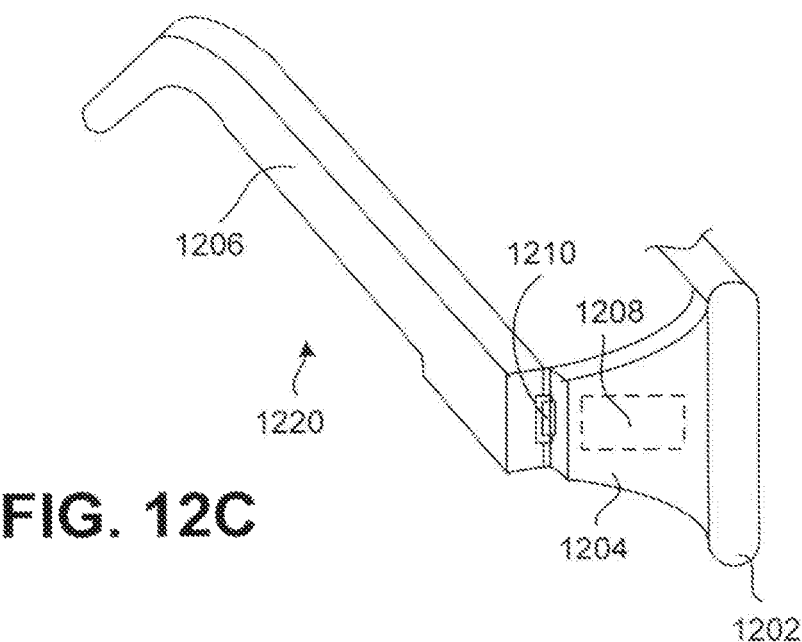

The side view of an eyeglass frame 1220 illustrated in FIG. 12B is similar to the eyeglass frame 1200 illustrated in FIG. 12A. However, in this embodiment, the temple 1206 is coupled to the extended endpiece 1204 by way of a joint (or hinge) 1210. FIG. 12C illustrates the eyeglass frame 1220 with the temple 1206 being substantially closed with respect to the eyeglass frame 1220. As noted in FIG. 12C, the temple 1206 can rotate (or pivot) with respect to the extended endpiece 1204 by way of the joint (or hinge) 1210. In this embodiment, the temple 1206 is able to be rotated (or pivoted) as in conventional eyewear such that (i) the temples can be closed or folded inwards towards the lens holders when not being worn, which can facilitate storage or (ii) the temples can be extended to an open position or extended outwards away from the lens holders, so that the eyeglasses can be worn. While retaining the traditional notion of the folding temples, the eyeglass frame 1220 causes the joint 1210 to be set back from the lens holder 1202 so that the endpiece is extended, which can facilitate including or storing one or more electoral components within the endpiece.

Figure 12D:
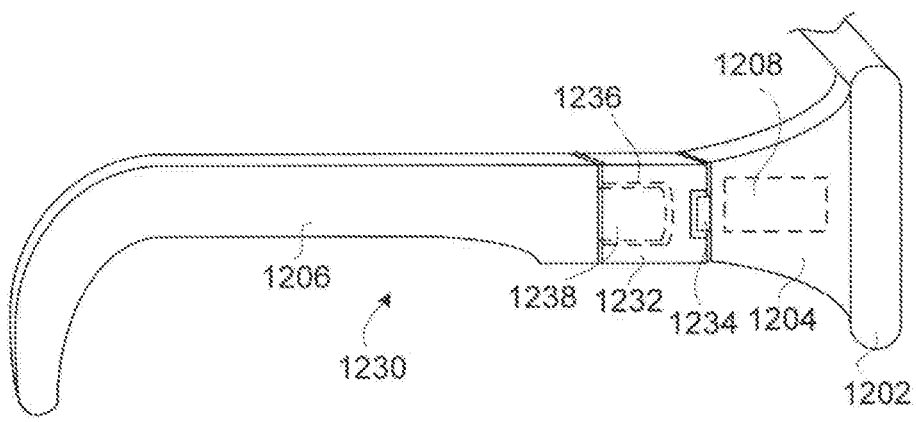

The side view of an eyeglass frame 1230 illustrated in FIG. 12D is similar to the eyeglass frame 1200 illustrated in FIG. 12A. However, in this embodiment, the temple 1206 is coupled to the extended endpiece 1204 by a linking temple piece 1232. The linking temple piece 1232 couples to the extended endpiece 1204 by way of a joint (or hinge) 1234. The joint 1234 allows the linking temple piece 1232 to rotate (or pivot) with respect to the extended endpiece 1204. In addition, the linking temple piece 1232 includes a connector 1236 that is capable of receiving a corresponding connector 1238 associated with the temple 1206. In this embodiment, the temple 1206 couples to the linking temple piece 1232 using the connectors 1236 and 1238 which provide physical connection (and optionally also electrical connection). The linking temple piece 1232 in turn can couple to the extended endpiece 1204 by way of the joint (or hinge) 1234. The temple 1206 is thus easily removable from the linking temple piece 1232 of the eyeglass frame 1230.

Figure 12E:
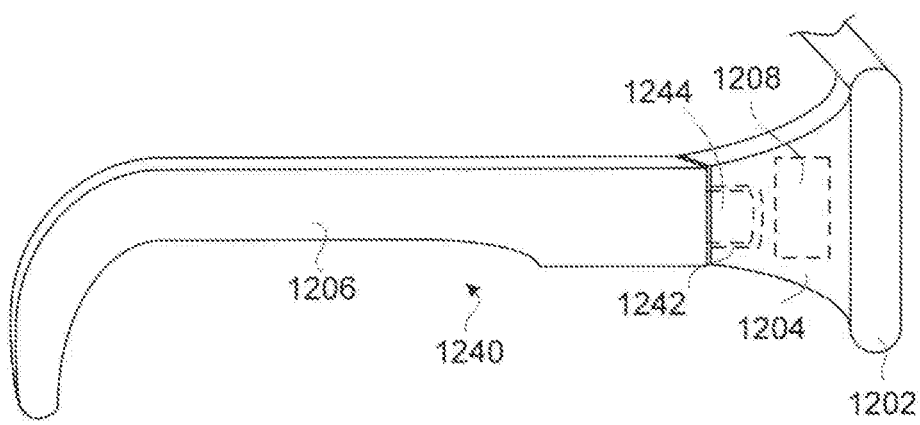

The side view of an eyeglass frame 1240 illustrated in FIG. 12E is similar to the eyeglass frame 1200 illustrated in FIG. 12A. However, in this embodiment, the extended endpiece 1204 includes a first connector 1242, and the temple 1206 includes a corresponding connector 1244. Here, the temple 1206 can be removably connected to the extended endpiece 1204 by way of the connectors 1242 and 1244.

According to still another embodiment of the invention, temples for eyeglass frames can be not only removable but also piecewise replaceable. In other words, an entire temple can be removed and replaced with respect to an eyeglass frame. In another implementation, a portion of a temple can be removed and replaced with another portion. Allowing temples of eyeglass frames to be removed and replaced facilitates incorporating different electronic modules that are internal to, integral with, or at least partially embedded in the temples (or temple portions) to the changed. Also, the different temple portions can have different design appearances that allow the design of the eyeglasses, namely the temples, to be altered as desired by a user. In other words, the temples or temple portions can be swappable.

Figure 13A:
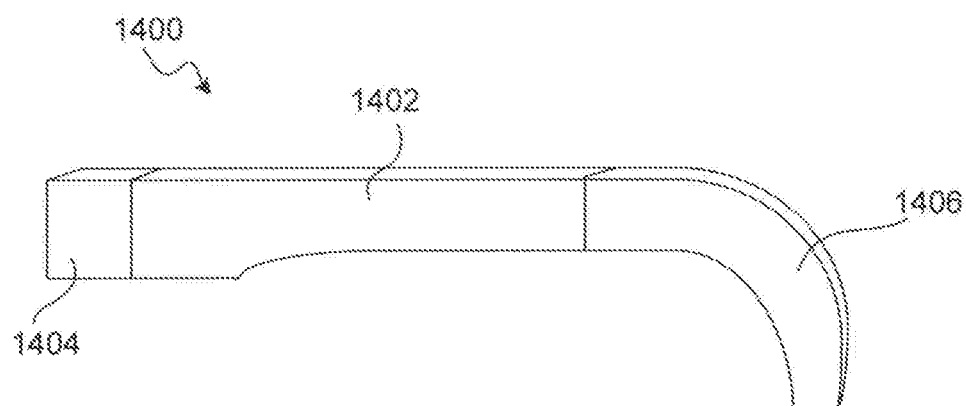
FIG. 13A illustrates a temple having multiple parts according to one embodiment of the invention.

FIG. 13A illustrates a temple 1400 having multiple parts according to one embodiment of the invention. The temple 1400 includes a temple base 1402 that couples to a forward portion 1404 of an eyeglass frame. The forward portion 1404 can, for example, pertain to an endpiece or a portion in the vicinity of a hinge (or joint) of a temple. In addition, the temple 1400 includes a temple tip 1406 (or rearward portion). One end of the temple base 1402 can connect to the forward portion 1404 and the other end of the temple base can connect to the temple tip (or rearward portion) 1406. In one embodiment, the temple base 1402 and the temple tip 1406 of an eyeglass frame can be replaced (individually or in combination) with other temple bases and temple tips. For example, the temple base 1402 and/or the temple tip 1406 could be removed and replaced with another temple base and/or temple tip having a different functional capability or a different ornamental appearance.

Figure 13B:
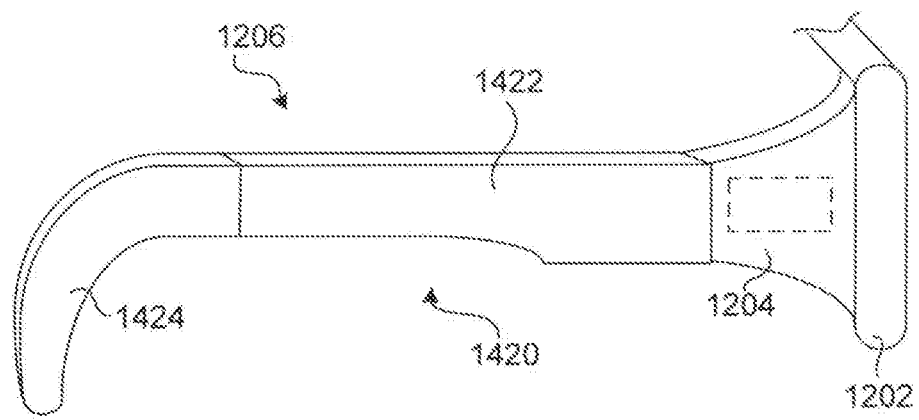
FIG. 13B illustrates a portion of an eyeglass frame according to one embodiment of the invention.

FIG. 13B illustrates a portion of an eyeglass frame 1420 according to one embodiment of the invention. The portion of the eyeglass frame 1420 is similar to a portion of the eyeglass frames 1200 illustrated in FIG. 12A. One difference is that the temple 1206 now explicitly illustrates a temple base 1422 and a temple tip 1424. The temple base 1422 and the temple tip 1424 can be removed and replaced (individually or in combination) with respect to the eyeglass frame, such as the extended endpiece 1204.

Figure 13C:
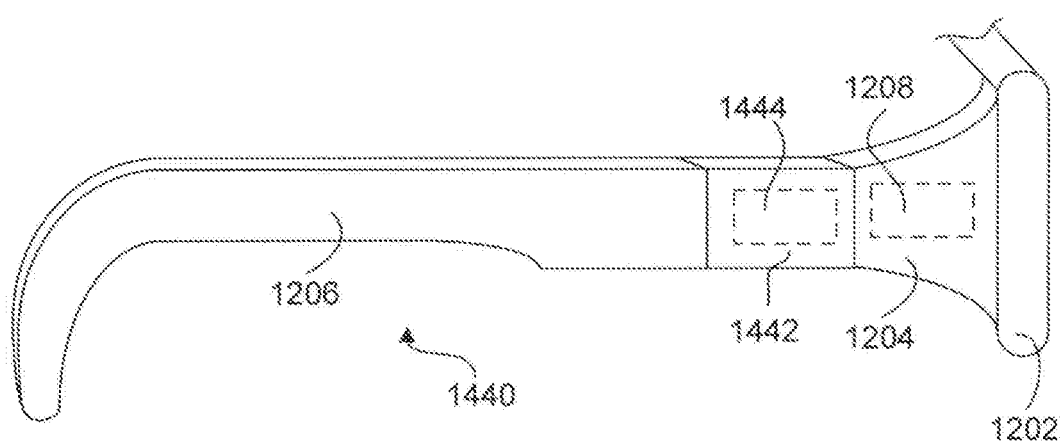
FIG. 13C illustrates a portion of an eyeglass frame according to another embodiment of the invention.

FIG. 13C. illustrates a portion of an eyeglass frame 1340 according to another embodiment of the invention. The portion of the eyeglass frame 1440 is similar to a portion of the eyeglass frame 1200 illustrated in FIG. 12A. However, in FIG. 13C, the portion of the eyeglass frame 1440 includes a temple insert 1442. The temple insert 1442 can include one or more electrical components 1444 internal to, integral with, or at least partially embedded in the temple insert 1442. As illustrated in FIG. 13C, the temple insert 1442 can be provided between the extended endpiece 1204 and the temple 1206 or the rearward portion of the temple. Although not shown in FIG. 13C, the connection between the temple insert 1442 and the extended endpiece 1204 or the temple 1206 can be through use of a joint (or hinge) or by way of connectors as discussed above. In this embodiment, the temple insert 1442 can provide electrical components that can interact with the electrical components 1208 within the extended endpiece 1204 or elsewhere within the eyeglass frame. Hence, a user can optionally include the temple insert 1442 between the temple 1206 and the extended endpiece 1204 to provide additional functionality to the eyeglasses. In one embodiment, when the additional functionalities are not desired, the temple insert 1442 can be removed from the temple configuration, or the one or more electrical components 1444 can be removed from the temple insert 1442.

The eyewear can contain lenses, either vision corrective lenses or non-corrective lenses. Examples of eyewear using corrective lenses include, for example, prescription glasses, bi-focal glasses, reading glasses, driving glasses, and progressive glasses. Examples of eyewear, using corrective or non-corrective lenses, are sunglasses, fit-over glasses, safety glasses, sports glasses, swim masks or goggles and ski goggles. The eyewear can also include wrap-around glasses (with wrap-around lenses), fit-over glasses, or auxiliary frames (which attach to existing frames). Still further, the eyewear can include a strap for glasses, such as a strap to hold glasses on one's head. The strap can include some or all of the components for monitoring radiation, such components can be attached or at least partially embedded in the strap.

The various aspects, embodiments, implementations and features of the invention noted above can be combined in various ways or used separately. Those skilled in the art will understand from the description that the invention can be equally applied to or used in other various different settings with respect to various combinations, aspects, embodiments, implementations or features provided in the description herein.

Certain aspects of the invention can be implemented in software, hardware or a combination of hardware and software. Certain aspects of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that electrical components can be provided integral with or attached to a temple arrangement, a temple adapter or a removable temple part for use with a pair of eyeglasses. Another advantage of the invention is that after-market changes to electrical capabilities of eyeglasses can be relatively easily achieved Another advantage of the invention is that communication, computation, information capturing or sensing, and/or operational capabilities can be provided for eyeglasses without substantial interference to style or design choices of the glasses. Still another advantage of the invention is that wireless communications, radiation monitoring, fitness monitoring and/or health monitoring can be supported by the electrical components. Yet another advantage of the invention is the ability to provide hands-free wireless communications capability.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Many features and advantages of the present invention are apparent from the written description. Since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. Eyewear, comprising:
an eyewear frame having a front section and first and second extended endpieces, the first and second extended endpieces being provided at opposite sides of the front section of the eyewear frame, the first extended endpiece being adjacent a first side of the front section, and the second extended endpiece being adjacent a second side of the front section;
at least one integrated circuit provided internal to the first extended endpiece of the eyewear frame; and at least one radiation detector at least partially internal to the first extended endpiece of the eyewear frame.

2. Eyewear as recited in claim 1, wherein the eyewear frame includes a first temple coupled to and rearward of the first extended endpiece, and a second temple coupled to and rearward of the second extended endpiece.

3. Eyewear as recited in claim 1, wherein the eyewear frame includes at least one first temple coupled to and rearward of the first extended endpiece.

4. Eyewear as recited in claim 1, wherein the eyewear frame includes a first rear side structure, and wherein a forward end of the first rear side structure mechanically couples to the first extended endpiece at a connection point that is set back from the front section.

5. Eyewear as recited in claim 4, wherein the eyewear frame comprises a magnetically-assisted switch for providing electrical connection.

6. Eyewear as recited in claim 5, wherein the magnetically-assisted switch is positioned proximate to the connection point where the forward end of the first rear side structure couples to the first extended endpiece.

7. Eyewear as recited in claim 4, wherein the eyewear comprises a magnetic element provided adjacent the forward end of the first rear side structure.

8. Eyewear as recited in claim 4, wherein the second extended endpiece comprises a battery.

9. Eyewear as recited in claim 1,
wherein the eyewear frame comprises a battery,
wherein the eyewear comprises:
   a charging circuit electrically connected to the battery, the charging circuit being embedded in the eyewear; and
wherein the eyewear further comprises a connector port that is electrically connected with the charging circuit, the connector port being at least partially embedded in the eyewear frame.

10. Eyewear as recited in claim 9,
wherein the eyewear frame includes a first rear side structure, and wherein a forward end of the first rear side structure mechanically couples to the first extended endpiece at a connection point that is set back from the front section.

11. Eyewear as recited in claim 10, wherein the first rear side structure mechanically couples to the first extended endpiece via a hinge, the hinge being provided adjacent an interface between the forward end of the first rear side structure and the first extended endpiece.

12. Eyewear as recited in claim 11, wherein the eyewear comprises a switch component provided adjacent the hinge.

13. Eyewear as recited in claim 1, wherein the front section of the eyewear frame includes one or more lens holders to hold one or more lens, the one or more lens permit a user whom wears the eyewear to view its physical environment through the one or more lens.

14. Eyewear as recited in claim 1, wherein the eyewear comprises:
a microphone; and
an audio output device,
wherein the wireless transmitter and/or receiver, the microphone and the audio output device are each at least partially embedded in the eyewear.

15. Eyewear as recited in claim 1,
wherein a portion of the first extended endpiece is attached or adjacent to a first end of the front section, and wherein a portion of the second extended endpiece is attached or adjacent to a second end of the front section, the first and second ends of the front section being at opposite ends of the front section, and
wherein a forward portion of the first extended endpiece is provided in the plane of the front section, and wherein a forward portion of the second extended endpiece is provided in the plane of the front section.

16. Eyewear as recited in claim 15, wherein the eyewear comprises:
a visual indicator configured to signal, to a person, information concerning at least an operational status pertaining to an electrical component of the eyewear.

17. Eyewear as recited in claim 16, wherein the eyewear comprises:
a battery embedded in the eyewear; and
a charging circuit electrically connected to the battery, the charging circuit being embedded in the eyewear.

18. Eyewear as recited in claim 17, wherein the eyewear further comprises a connector port that is electrically connected with the charging circuit, the connector port being at least partially embedded in the eyewear frame.

19. Eyewear as recited in claim 17, wherein the eyewear frame comprises a magnetically-assisted switch for providing electrical connection.

20. Eyewear as recited in claim 19, wherein the magnetically-assisted switch is positioned proximate to the connection point where the forward end of the first rear side structure couples to the first extended endpiece.

21. Eyewear, comprising:
an eyewear frame having a front section and first and second extended endpieces, the first and second extended endpieces being provided at opposite sides of the front section of the eyewear frame, the first extended endpiece being adjacent a first side of the front section, and the second extended endpiece being adjacent a second side of the front section;
at least one integrated circuit provided internal to the first extended endpiece of the eyewear frame; and
at least one light generating device at least partially internal to the first extended endpiece of the eyewear frame.

22. Eyewear as recited in claim 21, wherein the eyewear frame includes a first rear side structure, and wherein a forward end of the first rear side structure mechanically couples to the first extended endpiece at a connection point that is set back from the front section.

23. Eyewear as recited in claim 22, wherein the eyewear frame comprises a magnetically-assisted switch for providing electrical connection.

24. Eyewear as recited in claim 23, wherein the magnetically-assisted switch is positioned proximate to the connection point where the forward end of the first rear side structure couples to the first extended endpiece.

25. Eyewear as recited in claim 22, wherein the first rear side structure mechanically couples to the first extended endpiece via a hinge, the hinge being provided adjacent an interface between the forward end of the first rear side structure and the first extended endpiece.

26. Eyewear as recited in claim 25, wherein the eyewear comprises a switch component provided adjacent the hinge.

27. Eyewear as recited in claim 21,
wherein the eyewear frame comprises a battery,
wherein the eyewear comprises:
   a charging circuit electrically connected to the battery, the charging circuit being embedded in the eyewear; and wherein the eyewear further comprises a connector port that is electrically connected with the charging circuit, the connector port being at least partially embedded in the eyewear frame.

28. Eyewear as recited in claim 21, wherein the eyewear comprises a magnetic element provided adjacent the forward end of the first rear side structure.

29. Eyewear as recited in claim 21, wherein the second extended endpiece comprises a battery.

30. Eyewear as recited in claim 21, wherein the front section of the eyewear frame includes one or more lens holders to hold one or more lens, the one or more lens permit a user whom wears the eyewear to view its physical environment through the one or more lens.

31. Eyewear as recited in claim 21, wherein the eyewear comprises:
    a microphone; and
    an audio output device,
    wherein the wireless transmitter and/or receiver, the microphone and the audio output device are each at least partially embedded in the eyewear.

32. Eyewear as recited in claim 21,
    wherein a portion of the first extended endpiece is attached or adjacent to a first end of the front section, and wherein a portion of the second extended endpiece is attached or adjacent to a second end of the front section, the first and second ends of the front section being at opposite ends of the front section, and
    wherein a forward portion of the first extended endpiece is provided in the plane of the front section, and wherein a forward portion of the second extended endpiece is provided in the plane of the front section.

33. Eyewear as recited in claim 32, wherein the eyewear comprises:
    a battery embedded in the eyewear; and
    a charging circuit electrically connected to the battery, the charging circuit being embedded in the eyewear.

34. Eyewear as recited in claim 33, wherein the eyewear further 7the connector port being at least partially embedded in the eyewear frame.

35. Eyewear as recited in claim 34, wherein the eyewear frame comprises a magnetically-assisted switch for providing electrical connection.

36. Eyewear as recited in claim 35, wherein the magnetically-assisted switch is positioned proximate to the connection point where the forward end of the first rear side structure couples to the first extended endpiece.

37. A goggle, comprising:
    a front section;
    first and second extended endpieces, the first and second extended endpieces being provided at opposite sides of the front section, the first extended endpiece being adjacent a first side of the front section, and the second extended endpiece being adjacent a second side of the front section;
    at least one integrated circuit provided internal to the first extended endpiece; and
    at least one radiation detector at least partially internal to the first extended endpiece.

38. A goggle as recited in claim 37, wherein the goggle includes a rear structure, and wherein a forward end of the rear structure mechanically couples to one or both of the first and second extended endpieces at connection points that are set back from the front section.

39. A goggle as recited in claim 38, wherein the goggle comprises a magnetically-assisted switch for providing electrical connection.

40. A goggle as recited in claim 39, wherein the magnetically-assisted switch is positioned proximate to the connection point where the forward end of the rear structure couples to the first or second extended endpieces.

41. A goggle as recited in claim 38,
    wherein the goggle comprises a battery,
    wherein the goggle comprises:
        a charging circuit electrically connected to the battery, the charging circuit being embedded in the google; and
    wherein the google further comprises a connector port that is electrically connected with the charging circuit, the connector port being at least partially embedded in the goggle.

42. A goggle as recited in claim 38, wherein the front section of the goggle includes one or more lens holders to hold one or more lens, the one or more lens permit a user whom wears the goggle to view its physical environment through the one or more lens.

43. A goggle as recited in claim 37, wherein the goggle comprises:
    a visual indicator configured to signal, to a person, information concerning at least an operational status pertaining to an electrical component of the goggle.

* * * * *